(12) United States Patent
Wray et al.

(10) Patent No.: US 11,945,441 B2
(45) Date of Patent: Apr. 2, 2024

(54) EXPLAINABILITY AND INTERFACE DESIGN FOR LANE-LEVEL ROUTE PLANNER

(71) Applicants: Nissan North America, Inc., Franklin, TN (US); The University of Massachusetts, Boston, MA (US)

(72) Inventors: Kyle Hollins Wray, Mountain View, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 164 days.

(21) Appl. No.: 17/218,392

(22) Filed: Mar. 31, 2021

(65) Prior Publication Data
US 2022/0315000 A1    Oct. 6, 2022

(51) Int. Cl.
| | | |
|---|---|---|
| *B60W 30/00* | (2006.01) | |
| *B60W 30/18* | (2012.01) | |
| *B60W 60/00* | (2020.01) | |
| *G05D 1/00* | (2006.01) | |

(52) U.S. Cl.
CPC .... *B60W 30/18163* (2013.01); *B60W 60/001* (2020.02); *G05D 1/0212* (2013.01); *B60W 2540/21* (2020.02); *G05D 2201/0213* (2013.01)

(58) Field of Classification Search
CPC ......... B60W 30/18163; B60W 60/001; B60W 2540/21; G05D 1/0212; G05D 2201/0213; G01C 21/3484; G01C 21/3658
See application file for complete search history.

(56) References Cited

U.S. PATENT DOCUMENTS

| | | | | |
|---|---|---|---|---|
| 9,212,920 | B1 * | 12/2015 | Mannepalli | ........ G08G 1/09685 |
| 10,372,130 | B1 * | 8/2019 | Kaushansky | ......... B60W 50/14 |
| 10,969,232 | B1 | 4/2021 | Johnson et al. | |
| 11,199,841 | B1 | 12/2021 | Van Den Berg | |
| 2005/0107951 | A1 * | 5/2005 | Brulle-Drews | .... G01C 21/3697 |
| | | | | 701/533 |

(Continued)

FOREIGN PATENT DOCUMENTS

| | | |
|---|---|---|
| CN | 111076731 A | 4/2020 |
| DE | 102009047410 A1 | 6/2011 |

(Continued)

OTHER PUBLICATIONS

Machine translation WO2018189844 (year: 2018).*

(Continued)

*Primary Examiner* — Anne Marie Antonucci
*Assistant Examiner* — Jordan T Smith
(74) *Attorney, Agent, or Firm* — Young Basile Hanlon & MacFarlane, P.C.

(57) ABSTRACT

Providing explanations in route planning includes determining a route based on at least two objectives received from a user, where a second objective of the at least two objectives is constrained to within a slack value of a first objective of the at least two objectives; receiving, from the user, a request for an explanation as to an action along the route; and providing the explanation to the user. The explanation describes an extent of violating the slack value.

20 Claims, 11 Drawing Sheets

(56) References Cited

U.S. PATENT DOCUMENTS

| | | | |
|---|---|---|---|
| 2009/0210143 A1* | 8/2009 | Seltzer | G01C 21/28 701/532 |
| 2009/0271050 A1 | 10/2009 | Niki et al. | |
| 2016/0098496 A1 | 4/2016 | Joshi et al. | |
| 2016/0176397 A1 | 6/2016 | Prokhorov et al. | |
| 2016/0347327 A1 | 12/2016 | Kondo et al. | |
| 2017/0227966 A1 | 8/2017 | Monzen et al. | |
| 2017/0328725 A1 | 11/2017 | Schlesinger et al. | |
| 2018/0017398 A1* | 1/2018 | McNew | G01C 21/3453 |
| 2018/0209801 A1 | 7/2018 | Stentz et al. | |
| 2018/0273032 A1 | 9/2018 | Yang et al. | |
| 2018/0299290 A1 | 10/2018 | Slavin et al. | |
| 2019/0033861 A1 | 1/2019 | Groden et al. | |
| 2019/0113918 A1 | 4/2019 | Englard et al. | |
| 2019/0184990 A1 | 6/2019 | Lee et al. | |
| 2019/0311559 A1 | 10/2019 | Bigio et al. | |
| 2019/0346275 A1* | 11/2019 | Kelly | G01C 21/3415 |
| 2019/0383626 A1 | 12/2019 | Fowe et al. | |
| 2020/0005645 A1 | 1/2020 | Wray et al. | |
| 2020/0026279 A1* | 1/2020 | Rhodes | G01C 21/3476 |
| 2020/0125102 A1 | 4/2020 | Jiang et al. | |
| 2020/0217680 A1 | 7/2020 | Dewan et al. | |
| 2020/0249038 A1 | 8/2020 | Nashed et al. | |
| 2020/0310450 A1 | 10/2020 | Reschka et al. | |
| 2020/0346666 A1 | 11/2020 | Wray et al. | |
| 2021/0009161 A1 | 1/2021 | Kim et al. | |
| 2021/0031760 A1 | 2/2021 | Ostafew et al. | |
| 2021/0197852 A1 | 7/2021 | Fairfield et al. | |
| 2021/0199442 A1 | 7/2021 | Xie et al. | |
| 2021/0240197 A1 | 8/2021 | Shalev-Shwartz et al. | |
| 2021/0253128 A1 | 8/2021 | Nister et al. | |
| 2021/0364305 A1 | 11/2021 | Rizk et al. | |
| 2022/0176995 A1 | 6/2022 | Subramanian et al. | |
| 2022/0187083 A1* | 6/2022 | Cohen | G01C 21/3461 |

FOREIGN PATENT DOCUMENTS

| | | |
|---|---|---|
| GB | 2586490 A | 2/2021 |
| JP | 2019096186 A | 6/2019 |
| WO | 2018/115963 A2 | 6/2018 |
| WO | WO-2018189844 A1 * | 10/2018 |
| WO | 2019231455 A1 | 12/2019 |

OTHER PUBLICATIONS

Willy Wojsznis, Ashish Mehta, Peter Wojsznis, Dirk Thiele, Terry Blevins, Multi-objective optimization for model predictive control, ISA Transactions, vol. 46, Issue 3, 2007, pp. 351-361.

Wray et al., Multi-Objective POMDPs for Robust Autonomy; RSS 2020 Workshop Robust Autonomy; Jun. 15, 2020; 3 pages https://openreview.net/pdf?id=xewBjsJEKkR.

S. Saisubramanian, K. H. Wray, L. Pineda and S. Zilberstein, "Planning in Stochastic Environments with Goal Uncertainty," 2019 IEEE/RSJ International Conference on Intelligent Robots and Systems (IROS), Macau, China, 2019, pp. 1649-1654.

Wray et al.; U.S. Appl. No. 16/778,890; Explainability of Autonomous Vehicle Decision Makin; filed Jan. 31, 2020; 72 pages.

Wray et al., U.S. Appl. No. 16/696,235; Risk Aware Executor with Action Set Recommendations; filed Nov. 26, 2019; 61 pages.

Altman, E. (1999). Constrained Markov Decision Processes (1sted.). Routledge. https://doi.org/10.1201/9781315140223 (Year: 1999).

T. Weiskircher, Q. Wang and B. Ayalew, "Predictive Guidance and Control Framework for (Semi-)Autonomous Vehicles in Public Traffic," in IEEE Transactions on Control Systems Technology, vol. 25, No. 6, pp. 2034-2046, Nov. 2017, doi: 10.1109/TCST .2016. 2642164. (Year: 2017).

Kubil, Viktor, Vasily Mokhov, and Dmitry Grinchenkov. "Modelling the generalized multi-objective vehicle routing problem based on costs." Proceedings of International Conference on Applied Innovation in IT. vol. 6. No. 1. Anhalt University of Applied Sciences, 2018. (Year: 2018).

Xin L, Kong Y, Li SE, et al. Enable faster and smoother spatio-temporal trajectory planning for autonomous vehicles in constrained dynamic environment. Proceedings of the Institution of Mechanical Engineers, Part D: Journal of Automobile Engineering. 2021 ;235 (4): 1101-1112. (Year: 2020).

* cited by examiner

EXPLAINABILITY AND INTERFACE DESIGN FOR LANE-LEVEL ROUTE PLANNER

TECHNICAL FIELD

This disclosure relates generally to route planning, and more particularly to lane-level route planning for autonomous vehicles.

BACKGROUND

Route planning applications and systems (collectively, route planners) may be onboard vehicle systems or in handheld devices. The user (e.g., a driver) provides a destination and the routing application calculates a route from a current location of the user to the destination.

The route may be overlaid on a map and may include (e.g., show, etc.) the roads and turns that the user can follow to arrive at the destination. That is, the route can include turn-by-turn instructions to the destination. The route typically includes the roads and the turns and it is up to the user (e.g., driver) to decide what lane of a particular road the driver drives on and when to switch lanes, such as to take an exit or turn at an intersection.

Traditional route planners may warn/notify the user that a turn (e.g., an exit) is coming up within a certain distance (e.g., 2 miles), and it is up to the user to decide how to maneuver from a current lane to make the turn. Such route planners do not know which lane the host vehicle is in and by merely notifying the user within the certain distance, the user may be forced to make unsafe maneuvers to move from a current lane to the turn location.

Such route planning applications may deterministically plan at the road level and do not take into account lane-level information/planning. They may model route planning as a classical planning problem that attempts to minimize the route time.

At least for these reasons, road-level, instead of lane-level, route planning may not be appropriate (e.g., sufficient) for autonomous driving because the planning map in such route planning applications may be at a level of abstraction above what is required for autonomous driving where a driver may not be involved at all or, at best, minimally involved.

SUMMARY

A first aspect is a method for providing explanations in route planning. The method includes determining a route based on at least two objectives received from a user, where a second objective of the at least two objectives is constrained to within a slack value of a first objective of the at least two objectives; receiving, from the user, a request for an explanation as to an action along the route; and providing the explanation to the user. The explanation describes an extent of violating the slack value.

A second aspect is an apparatus for route planning for an autonomous vehicle (AV). The apparatus includes a processor that is configured to receive, from a user, a first objective for optimizing a route from an origin location to a destination; receive, from the user, a second objective for optimizing the route from the origin location to the destination; receive, from the user, a slack value that defines a deviation from the first objective to improve the second objective; determine a route that satisfies the first objective and the second objective and the slack value; and control the AV to traverse the route.

A third aspect is a non-transitory computer-readable storage medium that includes executable instructions that, when executed by a processor, facilitate performance of operations for route planning for an autonomous vehicle (AV). The operations include operations to receive, from a user, a first objective for optimizing a route from an origin location to a destination; receive, from the user, a second objective for optimizing the route from the origin location to the destination; receive, from the user, a slack value that defines a deviation from the first objective to improve the second objective; determine a route that satisfies the first objective and the second objective and the slack value; control the AV to move from a first lane segment to a second lane segment along the route; receive, from the user, a request for an explanation as to why the second lane segment instead of a third lane segment was taken; and provide the explanation. The explanation includes respective descriptors of the first objective, the second objective, and an extent to which the slack value is violated.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
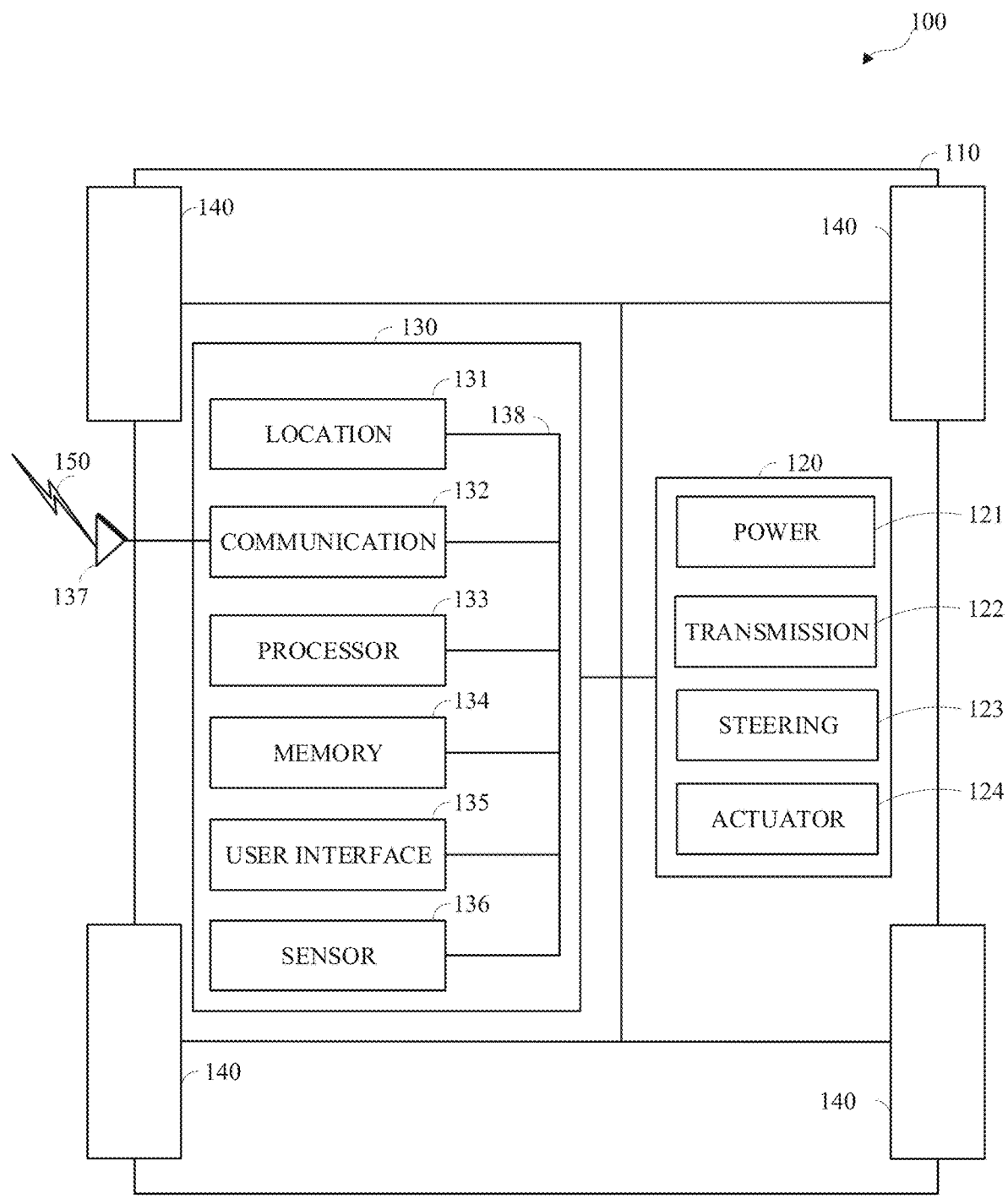
FIG. 1 is a diagram of an example of a vehicle in which the aspects, features, and elements disclosed herein may be implemented.

As mentioned above, route planners typically provide a route without any lane information. Such routes may be planned based on a connected graph of global positioning system (GPS) coordinates and cannot be used for autonomous driving because they are far too abstract. Autonomous driving requires lane-specific information to make lane changes and decisions and plan for contingencies when failures to follow the route occur for whatever reason. In traditional route planner maps, the topology, connectivity, and lane information are typically not available. Autonomous driving, as used herein and unless the context indicates otherwise, encompasses performing vehicle travel control for automatically running a host vehicle in a way as compared to manual control, such as by a human driver or a tele-operator.

Furthermore, such route planner may typically solve for only one objective: time. That is, they perform classical route planning by minimizing a time it takes to reach a destination. Some route planners may allow the user to specify a preference for road types (e.g., highway roads instead of rural roads, toll-free roads instead of toll roads). However, autonomous driving requires route planning using different (e.g., more) criteria, constraints, and/or objectives.

To illustrate using a simple example, in the case of traditional route planners, when a driver does not make an expected turn or take an exit, the route planner typically performs a "re-routing" operation, which takes at least several seconds to complete, to identify an alternate route. In the case of autonomous driving, and assuming that, due to congestion, an autonomous vehicle (AV) was not able to take an exit, it would not be acceptable for the AV to stop in place until the routing application identifies an alternate route (i.e., re-routes) or to pass a contingency route while it is performing the re-routing operation.

Rather, a route planner according to this disclosure can pre-plan for all contingencies. The contingencies can be incorporated into a policy, as further described below. In an example, the contingencies can be planned taking into account prior probabilities. The probabilities can be based on historical data of lane segment traversals. The probabilities can include probabilities succeeding lane changes, probabilities of failing to make lane changes based on traffic, probabilities of traffic histories, or other probabilities. The lane-level route planner can also plan routes based on levels of competence of autonomous driving on different roads or road segments. Competence is further described below. The route planner can also determine (e.g., plan) the transfer of control between autonomous driving, a driver, and/or a tele-operator. The lane-level route planner uses a navigation map that incorporates the probabilities.

To reiterate, a route planner according to this disclosure determines a lane-level route to a destination including locations along the route where the AV is to controlled to make lane changes. That is, lane changes and, possibly, failures along the route can be planned by the route planner. Additionally, the route planner can have a contingency plan for all possible routes to the goal (e.g., a destination) instead of just obtaining a deterministic plan that assumes success and failure and minimizing some cost (e.g., time to the destination).

Real-world deployment of autonomous vehicles may need to balance several objectives at the same time. The several objectives can include time to destination, desired user comfort (e.g., bumpy vs. smooth roads), desired user road speed, road navigation ability (e.g., whether the vehicle is competent to traverse the road or lane), transfer points among geo-fenced areas, and/or other objectives. In the case of electric or hybrid-electric vehicles, additional objectives can relate to battery efficiency and/or stop points for recharging. Lane-level route planning according to this disclosure can perform such multi-objective planning.

In aspects of this disclosure, the navigation map including lane-level information can be learned. The navigation map can then be used to generate lane-level routes.

Traditional autonomous vehicle route planners may not learn with regards to multiple state features or objectives. Contrastingly, in lane-level route planning according to implementations of this disclosure, a navigation map can incorporate, with respect to lane segments of a lane of a road and via learning, at least some of environment information, vehicle information, human information, fewer, more, other information, or a combination thereof, as further described herein.

As the risk-aware multi-objective lane-level route planning described herein reasons in a space of multi-objectives for autonomous and connected vehicles, customized learning tailored for the stochasticity in each lane, as well as the specific delineated objective reward values, are required and are described herein.

Learning with multi-objectives can be advantageous over single-objective learning at least because more concerns can be considered by the lane-level route planner, which can make automated driving more adaptable than single objective planners. When multiple objectives are possible, the lane-level route planner can learn (or can be taught by a user) about good (e.g., desirable, comfortable, etc.) routes, traffic patterns, user preferences, competence, and so on. For example, the user can directly encode a preference in an exact corresponding objective.

Some route planners can only inform users of general information about a route, such as the number of lanes in an exit, that an exit is upcoming, and the like. Some other route planners may indicate that a certain route is longer or shorter than a current route by a certain number of minutes or some other unit of measure. However, such route planners are not typically explainable: they do not provide explanations as to why a certain route was selected over another. In the context of autonomous driving, such route planners may not be able to explain why an action (e.g., turn left, turn right, go straight, move to a neighboring lane segment, etc.) will be taken or was taken.

Some route planners may be implemented as neural networks (e.g., deep-learning neural network, etc.). Such route planner may not be able to provide human-understandable explanations. The inference model of such route planners amounts to weight and activation values (e.g., millions of real numbers) that do not have semantic meanings. A decision (e.g., a selected action) of such a route planner amounts to which nodes of the model were activated using the weight values. Extracting explanations from such route planners, even if possible at all, is not straight forward and may require additional systems that attempt to explain the route planner itself (e.g., the meanings of the activation values based on the inputs). As such, the route planner amounts to a un-explainable black box. While, the activation values resulting in a specific action of a neural network may be output, such activation values are not easy to interpret and do not have semantic meanings. In another example, to understand why an action was recommended by a route planner, the source code and the inputs to the source code may need to be analyzed to provide the explanation.

Contrastingly, a lane-level route planner according to implementations of this disclosure can be inherently explainable. The lane-level route planner can provide human-understandable explanations as to why actions (and equivalently, routes, lanes, or lane segments) are selected. The explanations can be human-interpretable and are also semantically meaningful. The explanations (e.g., sentences) can describe why decisions in autonomous driving were made. For example, user questions such as "why did you not go right at the intersection?", "why are you asking me to take manual control?", and so can be answered. Providing explanations as to action, road, or lane-segment selections in route planning provide an improvement over traditional route planners, especially in route planning for autonomous driving. Providing explanations can provide the users comfort with the decision making of autonomous driving selections. Additionally, understanding why certain selections are made enables to user to influence and refine route planning decision criteria to better fit the user preferences by, for example, providing different objectives and constraints on those objectives.

Furthermore, as lane-level route planners as described here can plan routes according to (e.g., using, based on, etc.) multiple objectives that have semantic meanings, the lane-level route planners can quantify or explain how certain routes are better (or worse) for certain objectives (such as traffic, preferences, competence of the human to drive or automated driving, and so on).

In further aspects of this disclosure, routes can be planned using standard definition map data (or simply, an SD map) and roads of an SD map can be mapped to obtain HD map information.

Route planners typically use map data to obtain (e.g., calculate) routes. In traditional route planners, the map data can be SD map data. An SD map typically includes roads, intersections, and the like but does not include sufficient detail or precision, which are required for autonomous driving (e.g., decision making in autonomous driving) and for route planning for autonomous driving (e.g., lane-level route planning). An SD map may include rough GPS coordinates for navigation (as opposed to, for example, automated driving decision making). Autonomous driving may require High definition (HD) maps.

A HD map data can include accurate information regarding a vehicle transportation network to within a few centimeters. An HD map data can include details regarding curbs, lane boundaries, crosswalks, traffic lights, road dividers, traffic signals, traffic signs, speed limits, landmarks, or the like.

HD maps can be expensive or may not include information regarding certain roads (or lanes of roads). A road or an area may be said to be unmapped. An HD map does not include information of unmapped roads and areas.

While an AV includes sensors capable of detecting HD information for decision making purposes or trajectory planning, the AV may only include an SD map for navigation purposes. The SD map cannot by default be localized and matched to the HD information observed by the sensors of the AV so that the SD map can also be used for decision making in autonomous driving. As such, the issue is that AVs (i.e., modules therein) still need to know the HD information for autonomous driving. According to this disclosure, autonomous driving can be performed on roads of an SD map in order to obtain the HD information for subsequent route planning.

In aspects of this disclosure, sensors data from one or more vehicles can be used to supplement an SD map with information (e.g., HD information) so that the SD map can be used for lane-level route planning as described herein for autonomous driving. As such, using sensor data to supplement the HD map enables a lane-level route planner to obtain routes using the SD map or a combination of an HD map and an SD map. The HD map can be used for mapped roads and lanes and the SD map can be used for roads and lanes that are unmapped in the HD map but for which HD information has been obtained as described herein. For ease of reference, an augmented HD map, as used herein, refers to an HD map that has been supplemented by data obtained using sensors of one or more AVs regrading roads of an SD map. Additionally or equivalently, the navigation map can be augmented with information of the roads of the HD map as these roads are traversed.

An augmented HD map can have many benefits including that an HD map may not be required for route planning or decision making. For example, an AV, or a fleet of AVs, can generate their own HD maps as roads of SD maps are traversed. As further described below, HD map generation can be done through a planning belief-based route planner. Benefits also include that the HD map can be adaptable. For example, if road lanes are re-configured on the SD map (such as, lane closure due to construction or adding new lane), then the HD map can be adapted to the changes.

Further details of lane-level route planning are described herein with initial reference to an environment in which it can be implemented.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission 122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the illustrated embodiment, the controller 130 includes a location unit 131, an electronic communication unit 132, a processor 133, a memory 134, a user interface 135, a sensor 136, and an electronic communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the electronic communication interface 137, the electronic communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 is configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 includes a dedicated short range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 are combined.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
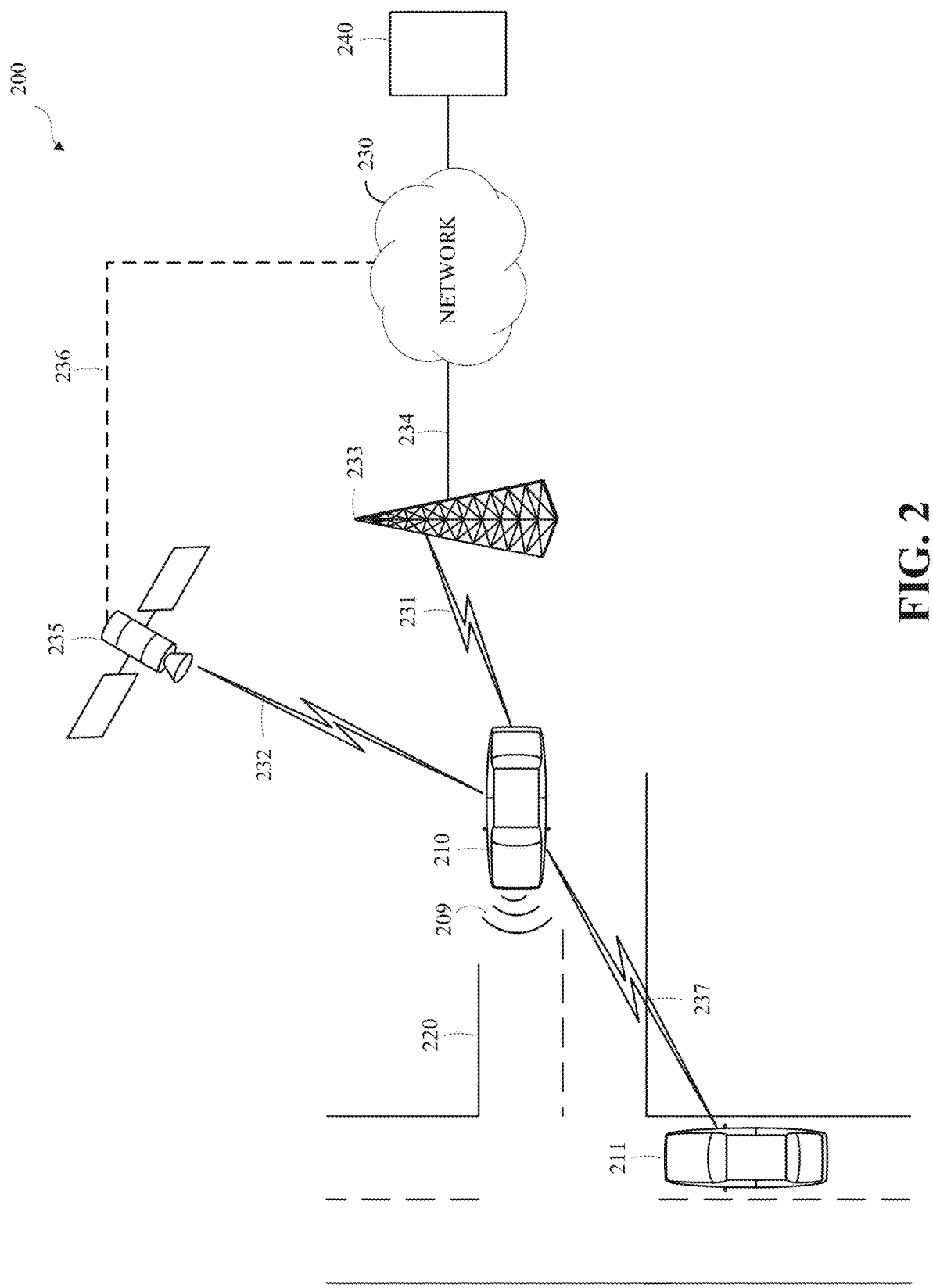
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more electronic communication networks 230. Although not explicitly shown in FIG. 2, a vehicle may traverse an off-road area.

The electronic communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication.

A vehicle 210/211 may communicate with another vehicle 210/211. For example, a host, or subject, vehicle 210 may receive one or more automated inter-vehicle messages, such as a basic safety message (BSM), from a remote, or target, vehicle (RV) 211, via a direct communication link 237, or via a network 230. The remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, is configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the communications network 230 via a satellite 235, or other non-terrestrial communication device. The satellite 235, which may include a computing device, is configured to communicate with a vehicle 210, with a communication network 230, with one or more communication devices 240, or with a combination thereof via one or more communication links 232/236. Although shown as a single unit here, a satellite may include any number of interconnected elements.

An electronic communication network 230 is any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the network 230, such as information representing the vehicle transportation network 220, information identified by one or more on-vehicle sensors 209, or a combination thereof.

Although FIG. 2 shows one vehicle transportation network 220, one electronic communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
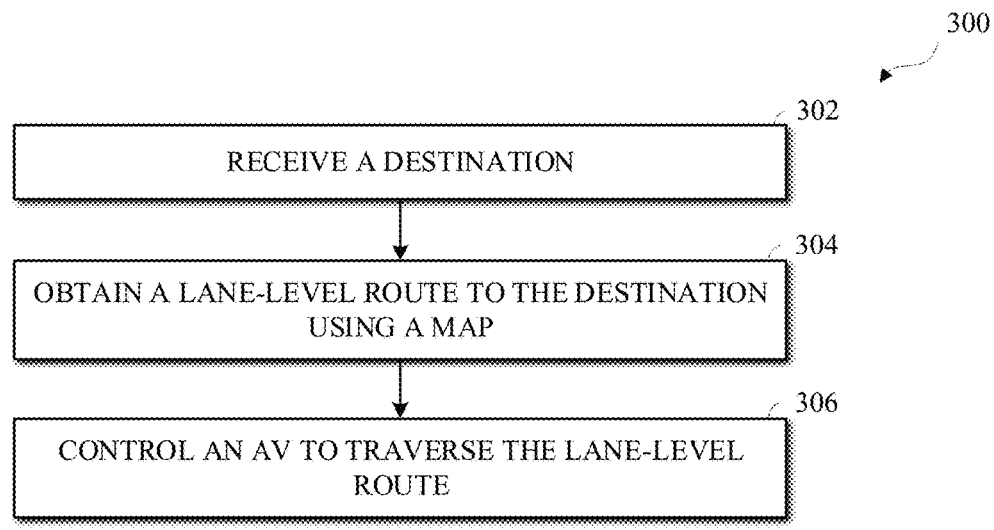
FIG. 3 is a flowchart diagram of an example of a technique for route planning in accordance with an embodiment of this disclosure.

FIG. 3 is a flowchart diagram of an example of a technique 300 for route planning in accordance with an embodiment of this disclosure. The technique 300 can be partially or fully implemented in a host vehicle, which can be the vehicle 100 shown in FIG. 1, one of the vehicles 210/211 shown in FIG. 2, a semi-autonomous vehicle, any other vehicle that may include drive-assist capabilities, or a vehicle that is manually controlled, such as by a driver. The technique 300 can be implemented as instructions (e.g., operations) that are stored in a memory, such as the memory 134 of FIG. 1. The instructions can be executed by a processor, such as the processor 133 of FIG. 1. The technique 300 can be implemented using specialized hardware or firmware. Multiple processors, memories, or both, may be used.

The technique 300 can be implemented partially or fully by a lane-level route planner. The lane-level planner can be implemented using a processor including a CPU (central processing unit), memory, and an input-output unit, such as described with respect to FIG. 1. A computer program that causes the processor to function as the lane-level route planner can be installed into and executed by the processor. This allows the processor to function as the lane-level route planner. Note that although here an example in which the lane-level route planner is implemented by software will be described, as a matter of course the lane-level route planner can be implemented by dedicated hardware prepared for executing each information process to be described herein.

At 302, the technique 300 received a destination. In an example, a user (e.g., a driver) can provide the destination via a user interface of the routing application. In an example, the user can provide the destination to a routing application, which may be executing on a portable device of the user. In another example, the vehicle may be performing a service (e.g., a robo-taxi service) and a the destination may be provided to the technique 300 via a dispatch process, which causes the vehicle to travel to the destination, which may be pick up location of a customer or package or a drop off location of the customer or package. Other ways of providing the destination to the technique 300 are possible. The destination may be an address, a landmark, a venue, or other destination type. The technique 300 can convert the received destination into a set of GPS coordinates.

At 304, the technique 300 obtains a lane-level route to the destination using a map (i.e., a navigation map or lane-level navigation map). The lane-level route includes a transition (i.e., an action to transition) from a first segment of a first lane of a road to a second segment of a second lane of the road. In an example, the destination may be (wirelessly)

provided transmitted to a server (e.g., a cloud-based server), such as the communication device 240 of FIG. 2, which calculates the lane-level route. An example of the map and the lane-level route are described with respect to FIG. 4.

Figure 4:
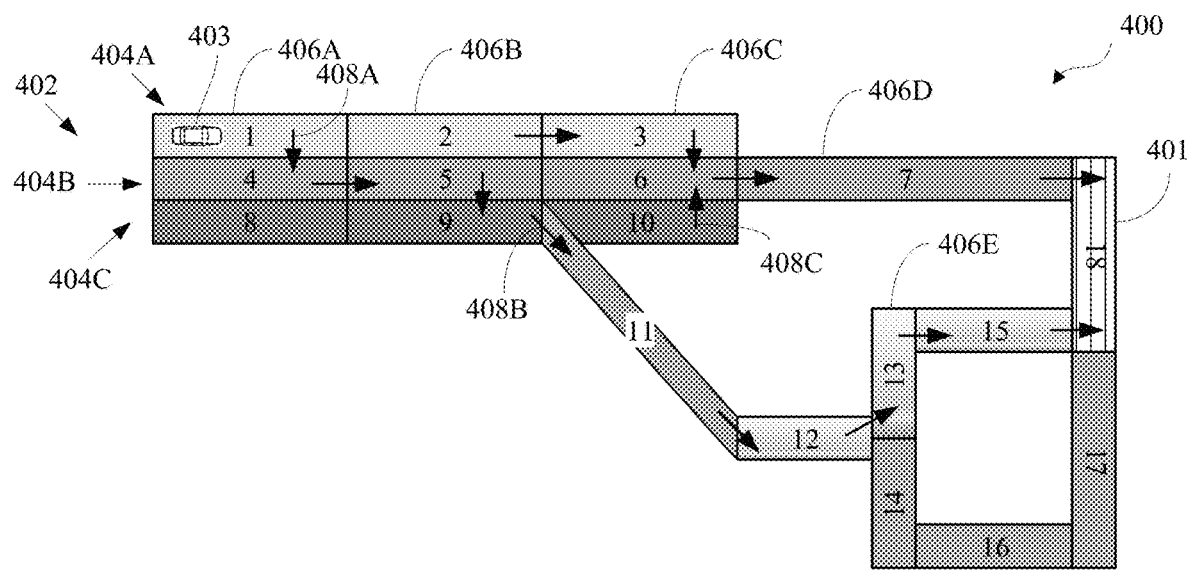
FIG. 4 is an illustration of an example of a map according to implementations of this disclosure.

FIG. 4 is an illustration of an example of a map 400 according to implementations of this disclosure. The map 400 illustrates that the destination is at a road segment 401. The map 400 includes a road 402 that includes three lanes, lanes 404A-404C. Lanes of the map 400 are partitioned into lane segments. The lane segments are indicated by the numbered segments in the map 400. For example, the lane 404A includes the lane segments 406A-406C. A vehicle 403 is currently in the lane segment 406A and is on its way to the destination at the lane segment 401. The lane segment 406A may be an intermediate lane segment between a starting point (not shown) of the vehicle 403 and the destination.

In an example, all road segments can have the same length (e.g., 100 meters, 200 meters, or some other segment length). In an example, at least some of the lane segment lengths can depend on the speed along the road of the lane segment. For example, at high speeds, the lane segments may have longer lengths, such as 500 meters. In an example, lengths of some of the lane segments can be adjustable. That is, for example, when generating a first lane-level route, the first lane-level route may be generated with some of the lane segments having a first length; and when generating a second lane-level route, the second lane-level route may be generated with the some of the lane segments having a second length. The lane segment lengths can be varied based on speed on a road, time of day (e.g., rush hour vs. weekend), socio-geographic region (e.g., school zone, residential neighborhood), weather (e.g., sunny vs. snowy), road type (e.g., freeway vs. urban road), more, fewer, other criteria, or a combination thereof. For example, and as is visually illustrated, the lane segment 406E is shorter than the lane segment 406C; but the lane segment 406D is longer than the lane segment 406C.

In the map 400, lane segments can have identification numbers (IDs). For example, the lane segments 406A-406E have, respectively, the IDs 1, 2, 3, 7, and 13. At least some of the lane segments can be associated with metadata. In an example, the metadata can include one or more classifications (e.g., designations). For example, the map 400 illustrates (using different shadings) that the lane segments with IDs 1, 2, and 3 are high-speed segments; that the lane segments with IDs 4, 5, 6, 7, and 11 are normal speed (e.g., speed limit) segments; that the lane segments with IDs 8, 9, and 10 are comfortable (e.g., lower speed) segments; that the lane segments with IDs 12, 13 and 15 are urban lane segments; and that the lane segments with IDs 14, 16 and 17 are manual-driving lane segments. These classifications are not necessarily mutually exclusive. For example, an urban lane segment can be a manual-driving lane segment.

A comfortable lane segment can be a lane segment where traffic may move at speeds that are within −10 (or some other threshold speed) miles per hour of the speed limit on the road of the lane segment. A manual-driving lane segment is a lane segment that cannot be autonomously traversed, or cannot be autonomously traversed with a sufficient degree of confidence. Such a lane segment has to be traversed under manual driving control, such as by a driver or a tele-operator. As such, the lane-level route planner can also include actions for notifying a user (e.g., a driver) a certain time ahead of the lane segment that the user should assume manual driving control of the vehicle.

In an example, obtaining the lane-level route can include obtaining a policy for traversing the lane segments from a source location to the destination. The policy includes lane transitions. More accurately, and as further described below, the policy provides actions given that the vehicle is in a current lane segment. In an example, the policy can be a deterministic policy. In another example, the policy can be based on a stochastic model.

While in route planning, minimizing time to destination is usually an objective of the route planner, the lane-level route planner according to this disclosure can obtain a lane-level route by optimizing for several objectives, as further described below.

The lane-level route can be obtained using a type of Markov Decision Process (MDP) model. Lane-level route planning can be modeled as topological partially observable Markov decision process (TPOMDP) or its fully observable subclass topological Markov decision process (TMDP). TPOMDPs and TMDPs allow for additional objective measures, such as maximizing safety, smoothness, and/or other human preferences, to be incorporated into a typical partially observable Markov decision process (POMDP) or Markov decision process (MDP) objective, such as minimizing time or distance traveled. Solving a TPOMDP model may be similar to solving the TMDP model, except that the TPOMDP is based on belief states (i.e., probabilities), representing probabilities for respective states and subject to observation probabilities corresponding to generating observations for respective states. Other model types are also possible. For example, the model can be one of a scalarized multi-objective Markov decision process (MOMDP), a scalarized partially observable multi-objective Markov decision process (MOPOMDP), a constrained Markov decision process (CMDP), or a constrained partially observable Markov decision process (CPOMDP).

To illustrate, and without loss of generality, the user may indicate a preference for slow lanes. As such, the route planner can integrate a "comfort" objective into its calculation of how to get to the destination. In another example, the user can additionally, or alternatively indicate a preference for lanes that minimize energy consumption. For example, if traffic on some lane segments is stop-and-go, which tend to require more energy consumption, then the route planner may prefer other road segments to them. As another example, a smooth road would be preferred by the route planner over roads with many ups and downs because such roads tend to result in more energy consumption. In another example, a road with many charging stations may be preferred over another road with sparse charging stations.

Without loss of generality, the model (e.g., TMDP or TPOMDP) can be described with stochastic shortest path (SSP) structure terminology (e.g., costs instead of rewards and goals as target states that self-loop upon arrival).

A connectivity graph (V, E, R) can be converted into a model represented by a tuple $\langle S, A, T, C, E, \delta, s_0, s_g \rangle$. Each vertex $v \in V$ can be a GPS coordinate for a point where a routing decision can be made. As such, a vertex can be the GPS coordinate of an intersection, of a lane change location (such as, for example, from the lane segment with ID 9 to the lane segment with ID 11), of a merge point, and so on. To illustrate, in the map 400, the vertices v can be the coordinates of certain points of the lane segments. For example, the certain points can be the mid-points of the lane segments. Each edge $e \in E$ of the connectivity graph can describe the directed graph of vertices for lengths or traversal time R(e). For example, in the connectivity graph underlying the map

400, the vertex corresponding to the lane segment with ID 9 would be connected to the lane segments with ID 10 and 11.

An overview of the formal model TMDP is now presented. As mentioned, the model can be formally described as a tuple $\langle S, A, T, C, E, \delta, s_0, s_g \rangle$. S can be a finite set of states or vertices $v \in V$. A is the action space at each vertex for choosing successor lane segment (or, equivalently, a successor vertex). To illustrate, and without loss of generality, the action space A can include the actions "move left," "move right," "go straight," or "move diagonally." However, more, fewer, other actions, or a combination thereof are possible. For example, the action space A can also include an action of notifying the user to assume manual control, an action of switching to manual control, an action notifying the user that control will switch to automated control, an action of switching to automated control, and so on.

$s_0$ is an initial state, which can be a current location of the vehicle at the time that the route planner calculates a lane-level route. $s_g$ can be the goal state, which can be the destination. Once the goal state $s_g$ is reached, the goal state is maintained no matter which action is then taken and every action taken in the goal state $s_g$ has a cost of 0.

T (i.e., $T: S \times A \times S \rightarrow [0,1]$) can be a state transition function that represents the probability that successor state $s' \in S$ occurs after performing an action $a \in A$ in a state $s \in S$. Thus, T is a state transition function that describes the stochastic success/failure of each action. The state transition function $T(s, a, s') = Pr(s'|s, a)$ can be the probability of successor (lane segment or vertex) s' given action a was performed in state s. In an example, the state transition function can include a respective probability for at least some (e.g., each) of the neighboring vertices (e.g., lane segments) of a vertex (e.g., lane segment). To illustrate, with respect to the lane segment with ID 1 (i.e., the lane segment 406A), the state transition function T can include a respective transition probability for some of the transitions from the lane segment with ID 1 to the lane segment with ID 4, the lane segment with ID 1 to the lane segment with ID 2, and/or the lane segment with ID 1 to the lane segment with ID 5. In some examples, the state transition function can include probabilities for transitioning to more distant neighbors (e.g., from the lane segment with ID 1 to the lane segment with ID 3).

As such, obtaining the lane-level route to the destination using the map can include obtaining a policy that, when the AV is on a first lane segment of the map, provides an action for controlling the AV to move to a second lane segment that neighbors the first lane segment.

The probabilities can be derived based on criteria including speed limits, lane lengths of edges e, specifications of the AV, time of day and location, traffic congestion information, more criteria, fewer criteria, other criteria, or a combination thereof. In an example, these probabilities (and/or the criteria used to obtain the transition probabilities) can be learned, as further described below.

$C(s, a)$ (i.e., $C: S \times A \rightarrow \mathbb{R}^k$) can represent a multi-cost function that represents the expected immediate cost(s) of performing an action $a \in A$ in state $s \in S$. As such, the lane-level route can be calculated using one or more objectives. The cost C can be modeled as a cost vector of optimization for one or more expected objectives. The one or more expected objectives can include a time objective $C_T$ (i.e., a first objective relating to time of minimizing the travel time to the destination), a comfort objective $C_C$ (i.e., a second objective relating to comfort indicating a preference for comfortable lane segments), an autonomy objective $C_A$ (i.e., a third objective relating to autonomy indicating a preference for lane segments where the vehicle can be autonomously controlled as opposed to manually controlled), an urban objective $C_U$ (i.e., a fourth objective relating to a preference for urban lane segments as opposed to, for example, rural lane segments), fewer objectives, more objectives, other objectives, or a combination thereof. In an example, a cost objective can be related to power generation.

Thus, in an example, the cost vector C can be given by $\vec{C}(s, a) = [C_T(s, a), C_C(s, a), C_A(s, a), C_U(s, a), \ldots]^T$, where each $C_i(s, a)$ denotes the cost objective i for being in a state s and performing the action a. In an example, the one or more objectives can include at least two of a first objective relating to time, a second objective relating to comfort, a third objective relating to autonomy, or a fourth objective relating to urban lane segments.

The objectives can be arranged in a preference ordering following a directed acyclic graph (DAG) E. Examples of preference ordering graphs are described below with respect to FIG. 5. Each objective can have a non-negative slack $\delta: e \rightarrow R+$, describing how much the user is willing to "spend" in the value of one objective to improve the value of another. As such, the one or more objectives are related in a preference ordering including slack variables.

A solution to the model can be a policy $\pi: S \rightarrow A$. Under the policy $\pi$, an action a (i.e., $\pi(s)$) is selected for a state s. That is, the policy $\pi$ can indicate that the action $\pi(s) \in A$ should be taken in state s. The policy it can include a value function $V^\pi: S \rightarrow C$ that can represent the expected cumulative cost $V^\pi(s)$ of reaching the destination (i.e., the goal state $s_g$) from a state s following the policy $\pi$. That is, the value function can provide an expected cost (i.e., a value) for each intermediate state $s_i$, from the start state until the goal state is reached.

An optimal policy, $\pi^*$ minimizes the expected cumulative cost. Formally, for the initial state $s_0$, the expected value can be given by formula (1):

$$V(s_0) = \mathbb{E}[\Sigma_{t=0}^\infty C(S_t, A_t) | S_0 = s_0, \pi] \quad (1)$$

In formula (1), $S_t$ and $A_t$ denote, respectively, the random variables of the state and action at time step t. In general, solving the model requires that a proper policy exists. A proper policy $\pi$ has the properties: (1) there exists a policy that reaches the goal with probability 1, and (2) all states that do not reach the goal with probability 1 result in an infinite cost.

At 306 of FIG. 3, the technique 300 controls the AV to traverse the lane-level route. Returning to FIG. 4, the arrows in FIG. 4 illustrate the actions under the determined policy $\pi$. An arrow 408A illustrates the action "when the state equals to the lane segment with ID 1, take the action right, which results in the vehicle ending in the state equals to the lane segment with ID 4." "Take the action" in this case means "cause the vehicle to be controlled" such as by changing an operation amount of an accelerator pedal, an operation amount of a brake pedal, changing the steering angle of a steering wheel, or the like.

The determined policy $\pi$ incorporates (e.g., includes) contingency routes. Thus, the obtained the lane-level route includes a contingency route. To illustrate, when the vehicle is in the lane segment with ID 9, the policy indicates that the vehicle is to be controlled to move to the lane segment with ID 11. However, should the vehicle not be able to take the lane segment with ID 11 and end up in the lane segment with ID 10, then the policy indicates a "take the action left" to move the vehicle to the lane segment with ID 6 and unto the lane segment with ID 7. As such, controlling the AV to traverse the lane-level route can include, in response to an inability to transition from the first segment to the second segment, controlling the AV according to the contingency route.

Figure 5:
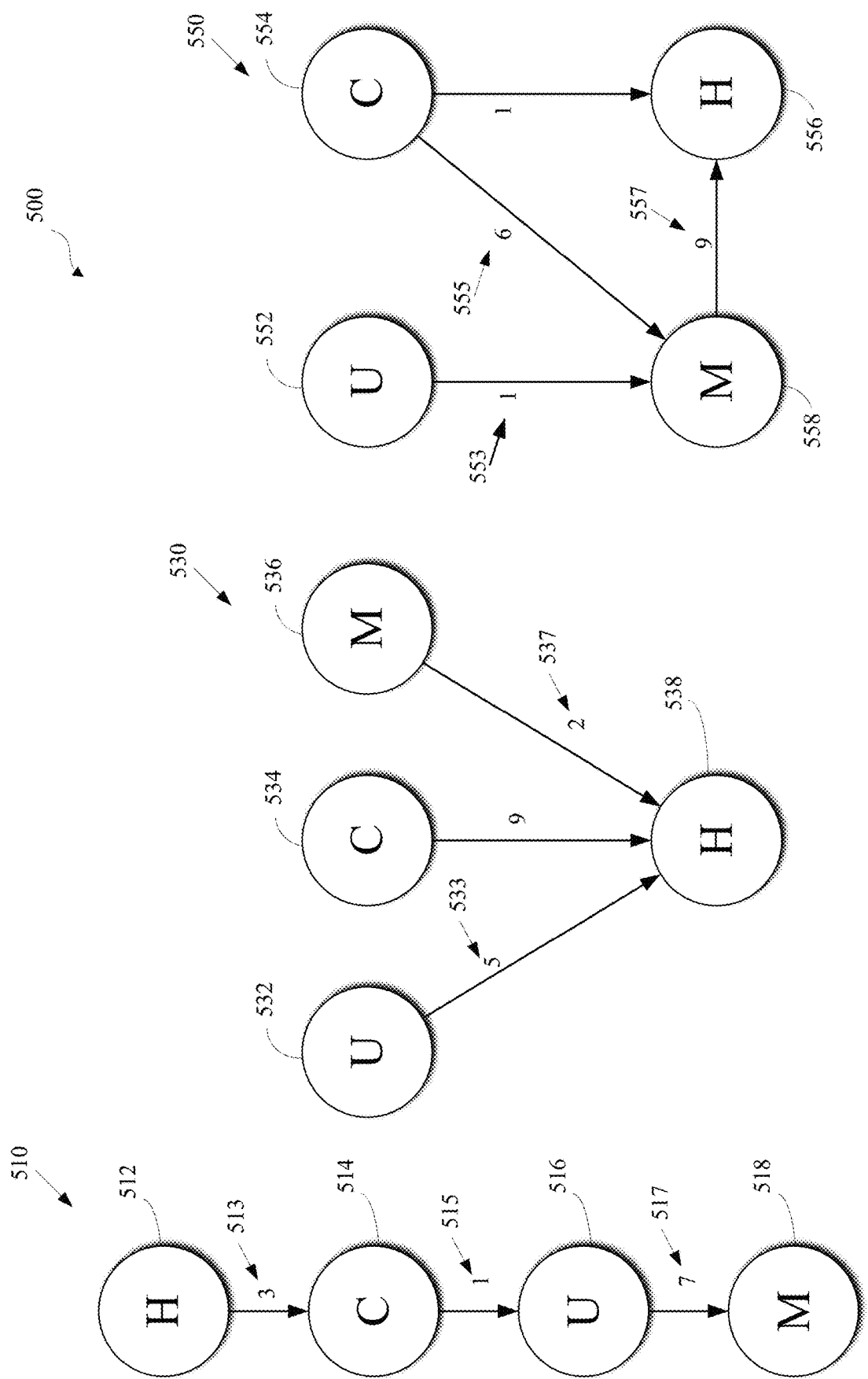
FIG. 5 illustrates examples of preference ordering graphs of objectives according to implementations of this disclosure.

FIG. 5 illustrates examples 500 of preference ordering graphs of objectives according to implementations of this disclosure. As mentioned above, the objectives of the model can be topologically ordered. The topologically ordered constraints can subject predecessor objectives to satisfying slack at the initial belief or across all beliefs. The lane-level route planner can reason about the objectives to calculate the policy, which are ordered in a topologically-ordered constraints graph. While three different preference orders are described, the disclosure is not so limited and other configurations (i.e., preference orders) are possible.

The objectives illustrated in the examples 500 relate to optimizing speed (i.e., the bubbles labeled H, such as objectives 512, 538, and 556), optimizing comfort (i.e., the bubbles labeled C, such as objectives 514, 534, and 554), optimizing urban driving (i.e., the bubbles labeled U, such as objectives 516, 532, and 552), and optimizing manual driving (i.e., the bubbles labeled M, such as the objectives 518, 536, and 558). The objectives illustrated are examples and other objectives are also possible. Furthermore, the illustrated preference ordering graphs are non-limiting examples and other preference ordering graphs including the same, or different objectives, and topologies are also possible. Each of these objectives is associated with a respective semantic label that can be meaningful to a human. As further described herein, users can use the semantic labels to indicate route preferences for the lane-level route planner.

An example 510 is an example of a chain preference ordering graph. When the preference ordering graph of the example 510 is used (i.e., when the objectives are related in a chain), the first high-speed objective is maximized (i.e., the objective 512); then the comfort objective (i.e., the objective 514) is maximized provided it is within a slack 513 (e.g., a slack of 3) of the high-speed objective; then the urban objective (i.e., the objective 516) is maximize provided it is within a slack 515 (e.g., a slack of 1) of the comfort objective, which was already constrained to guarantee it is within the slack 513 of the first objective; and lastly, the manual-driving objective (i.e., the objective 518) is maximized is maximize provided it is within a slack 517 (e.g., a slack of 7) of the urban objective, which was already constrained.

The example 510 can be interpreted (e.g., understood, etc.) as that the lane-level route planner preferring high speed roads (i.e., the objective 512) but would allow for a three-minute extra time (i.e., the slack 513) in order for the route planner to choose a different alternate route that is more comfortable (i.e., the objective 514)—the alternate route would also maximize the comfort objective. As such, a user may provide an input (e.g., issue a command, etc.) that essentially states "get me the fastest possible road, but allow for routes that are 3 minutes longer than the fastest in order to drive on more comfortable lanes." And similarly for the other objectives in the example 510. It is to be noted that the unit of measure of a slack variable is the same as the unit of measure of the objective it constrains.

As will be further described below, a user can specify the ordering of the objective with a verbal command that the route planner can convert to a preference ordering graph, via a graphical user interface (e.g., a drag-and-drop interface, a list, etc.), or some other way for the user to provide the preferences.

An example 530 is an example of a fan preference ordering graph. When the preference ordering graph of the example 530 is used (i.e., when the objectives have this fan-like relationship), the optimal policy is simultaneously computed for the urban objective (i.e., the objective 532), the comfort objective (i.e., the objective 534), and the manual driving objective (i.e., the objective 536). The final policy is then determined that maximizes the high-speed objective (i.e., the objective 538), subject to the slacks 533, 535, and 537 (i.e., the slack values 5, 9, and 2, respectively) of the three first objectives. This is equivalent to taking the intersection of the policy sets of the first three objectives and searching that space for the last objective.

An example 550 is an example of a directed graph that is a mixture of the examples 510 and 530.

For each objective (e.g., a bubble of the examples 500), the lane-level route planner obtains a set of routes that satisfy that objective. For example, with respect to the objective 552, the lane-level route planner identifies the optimal route (e.g., the minimum route to get to the destination on as many urban lanes as possible). One minute of slack (i.e., a slack 553) is allowed in order to get to the goal. As such, the route planner can be thought of as providing an envelope of possibilities around getting to the goal. That is, the route planner can identify all the routes that are within one minute of the most optimal time and whether or not they are on urban roads. Thus, a first set of routes satisfying the objective 552 within the slack 553 is returned.

A second set of routes satisfying the objective 554 (i.e., driving on lanes marked as comfortable) and that are within 6 minutes (i.e., a slack 555) of the most comfortable route. Similarly, a third set of routes satisfying the manual-driving objective to within 9 minutes (i.e., a slack 557) are also obtained; and so on. All the obtained sets of routes are passed to the objective 556 and the route that is then obtained from this sink objective has to be in all of the obtained sets of routes. In some situations, a route satisfying all the constraints and slacks may not be possible.

It is to be noted that an incoming arrow into a bubble in the examples 500 can be thought of as constraining that objective to be within the set (or sets, depending on the configuration of the preference ordering graph) of routes that the objective is given. As such, if there is no parent arrow (i.e., no incoming arrows), any route satisfying the objective within any slacks (if any) can be selected by the route planner. On the other hand, the route(s) selected has(have) to be in route(s) provided by parent objectives. As such, downstream objectives can be thought of as pruning provided (e.g., incoming) set(s) of routes.

In an example, instead of a preference ordering graph, a scalarization function can be used to map (e.g., combine, etc.) all the rewards (e.g., costs) to a single value. The scalarization function can be used to convert the model/problem into a shortest path optimization problem (SSP) MDP or POMDP. A single value indicating the long term utility of a next immediate action can be obtained using the scalarization function, which combines the expected costs to obtain the single value. Formally, the scalarization function $f:C \to \mathbb{R}$ can be such that, with respect to the single value, $f(V(s))=V_f(s)$ and, with respect to the cost functions $f(C(s))=C_f(s)$. In an example, the scalarization function can be a weighted sum of the objectives or a non-linear function of the objectives. Different weights can be used depending on the desired optimization. In an example, lane-level route planning can be modeled as a classical planning (CP) problem by removing any probabilities.

Regardless of the model used, lane-level route planning can be hierarchical. As can be appreciated, the higher the number of possible of lanes, the longer it might take to calculate the policy, if at all. To limit the number of lane segments that the lane-level route planner reasons about, lane-level route planning can be performed in a hierarchical fashion. For example, given a starting location in Miami, Florida and a destination in Fairbanks, Alaska, the lane-level route planner may group the roads of the United States into clusters, plan lane-level routes between clusters, and then perform route-level planning within each of the clusters of the route.

In an example, and as mentioned above, lane-level route planning can be modeled as a topological partially observable MDP (TPOMDP) to allow for a belief over, for example, (1) the level of traffic at each state, (2) the competence of at least one of the driver and/or the vehicle, and/or (3) the various objective costs.

More formally, the TPOMDP can be described as a tuple $\langle S, A, \Omega, T, O, R, E, \delta \rangle$.

S is a finite set of states. A is a finite set of actions. $\Omega$ is a finite set of observations. T is the state transition function such that $T(s, a, s')=Pr(s'|s, a)$ is the probability of successor state s' given action a was performed in state s. O is an observation function such that $O(a, s', \omega)=Pr(w|a, s')$ is the probability of observing $\omega$ given action a was performed resulting in successor state s'.

R is a vector of reward functions, which can be equivalent to the cost vector C described above. As also described above, E is the a set of edges over k rewards (e.g., costs) forming a directed acyclic graph, with one leaf (i.e., sink) reward vertex which, without loss of generality, is reward vertex k. $\delta$ is a function mapping edges $e=\langle i,j \rangle \in E$ to a non-negative negative slack constraint $\delta(e) \geq 0$ or, equivalently, $\delta(i, j) \geq 0$.

The TPOMDP operates over a belief $b \in B \subseteq \Delta^{|S|}$ of the world, where $\Delta^{|S|}$ is the probability distribution over states S and is as the standard |S|-simplex. Belief b is a probability distribution over states. Beliefs can exist for all time steps and for all forward, backward, successor, predecessor, etc. lane segments. Given belief b, after performing an action a and observing $\omega$, the next belief $b_{ba\omega}$ over state s' is:

$$b_{ba\omega}(s') a O(a,s',\omega) \Sigma_{s \in S} T(s,a,s') b(s) \quad (2)$$

where a means proportional

As mentioned above, TMDP is a subclass of TPOMDP with $\Omega=S$ and $O(a, s, s')=1$, such that the reachable beliefs $b \in B$ are $b(s)=1$ for all $s \in S$.

The objective in an infinite horizon TPOMDP seeks to maximize the expected discounted reward from an initial belief $b_0$ with discount factor $\gamma \in [0, 1)$. For a policy $\pi$, the expected discount reward can be given by $\mathbb{E} [\Sigma_{t=0}^{\infty} \gamma^t C(S_t, A_t) | S_0 = s_0, \pi]$ or, equivalently, $\mathbb{E} [\Sigma_{t=0}^{\infty} \gamma^t C(b^t, \pi(b^t)) | b^t, \pi]$ with $b^t$ denoting the random variable for the belief at time t generated following the transition function T and the observation function O that is the probability of a particular observation given an action a was performed resulting in successor state s'.

The value $V^{\pi}: B \to \mathbb{R}$ is the expected reward at belief b can be given by:

$$V^{\pi}(b) = R(b, \pi(b)) + \gamma \Sigma_{\omega \in \Omega} Pr(\omega|b, \pi(b)) V^{\pi}(b'_{b\pi(b)\omega}) \quad (3)$$

In equation (3), $R(b, a) = \Sigma_s b(s) R(s, a)$ and $b'_{b\pi(b)\omega}$ following the believe update in equation (2).

As mentioned herein, the lane-level route planner obtains a policy using a navigation map. In an example, the navigation map can be learned. Learned as used herein encompasses that the navigation map can be evolved. The navigation map may include pre-configured lane information and, as lane-level information is obtained from one or more vehicles, the pre-configured lane information can evolve to reflect (e.g., incorporate, etc.) the obtained lane-level information. The navigation map may not initially include lane-level information and the lane-level information can be constructed (e.g., populated, etc.) based on the lane-level information received from one or more vehicles.

The lane-level information may be continuously received and the navigation map regularly updated using the newly received lane-level information. The navigation map can be a navigation map of a particular vehicle (e.g., deployed in a particular vehicle) and the navigation map can be updated based on lane-level information from the vehicle itself.

Additionally or alternatively, the navigation map can be learned based on lane-level information received (such as at a server) from many vehicles. The lane-level information can be with a server, which can be a cloud-based server. As such, multiple vehicles can then receive more accurate initial estimates on time (before actually driving on the road), preferences about popular routes (in new areas), and competence information about where the fleet should be planning routes through (for vehicles sharing the same code/hardware).

Lane-level information may be obtained from many vehicles. Vehicles owned by particular customers can generate lane-level information. A deployed fleet of vehicles (such as to provide a taxi service, a delivery service, or some other service) can generate lane-level information. The lane-level information from a vehicle can be generated using data received from sensors of the vehicle. In an example, raw sensor data may be transmitted to the server and the server can generate the lane-level information using the raw sensor data.

As such, the navigation map can include learned historic driving patterns on, and characteristics of, different lanes and different lane segments of different roads. The historic driving patterns can be those of a particular vehicle, of a particular driver of the particular vehicle, or of an aggregated learned historic driving patterns of several vehicles.

The driving patterns of one or more drivers can be learned and used in lane-level route planning. The navigation map can include information about road conditions. Thus, a learned navigation map is one that can leverage/incorporate the history of driving behavior of drivers and/or characteristics of lanes (and more specifically, lane segments) therewith enabling lane-level route planning.

Lane-level information from multiple connected vehicles (such as connected to a cloud-based sever) can be combined into a shared navigation map. Each of the connected vehicles can transmit lane-level information to a server, such as the one or more communication devices 240, which can aggregate all of the obtained lane-level information to obtain the navigation map. Multi-vehicle multi-objective learning (i.e., lane-level information from multiple connected vehicles) can greatly speed up learning for a single vehicle and enables the vehicle to learn the values of routes (e.g., the lane-level information) before ever having driven on the roads themselves.

Over time, the server can receive information about many lane segments that many drivers have driven in an area and not just for a road that a specific vehicle has driven. The lane-level information can also include identifying information of the vehicle platforms (e.g., Nissan LEAF, Nissan Sentra, Nissan Rogue, etc.). In some example, the lane-level information can also include information (e.g., preferences, etc.) of particular drivers for which the lane-level information was generated. Using the received lane-level information traces, the server can then separate that information into those that depend on the vehicle (i.e., vehicle specification), the driving styles, road (e.g., including lane and lane-segment conditions), and/or other criteria to create unique navigation maps that are each specific to a particular vehicle, a particular vehicle platform, a particular driver, particular driving styles, or the like.

As mentioned above, with respect to lane segments of lanes of roads and via learning, at least some of environment information, vehicle information, human information, fewer, more, other information, or a combination thereof can be learned. The learned information can be converted to probabilities. The probabilities can be, can be incorporated in, or can be used by the state transition function, as described herein. The probabilities can also be used in setting objectives for a route (e.g., a policy) to be calculated.

The environment information can include one or more of traffic patterns, pedestrian patterns, traversal difficulties information of lane segments by vehicles (e.g., other AVs), weather information, burden information, more, fewer, other environment information, of a combination thereof. The vehicle information can include one or more of average speed information per lane segment, energy usage (e.g., battery usage for electric vehicles, gasoline and battery usage for hybrid vehicles, or gasoline usage for internal combustion engine vehicles), more, fewer, other vehicle information, or a combination thereof.

The human information can include one or more of preferred routes, preferred lanes, transfer of control requests (such as from automated to manual driving or from manual to automated driving), competence model updates via driver overrides, more, fewer, other human information, or a combination thereof. The transfer of control requests can include the lane segments at which the transfer of control was requested. The transfer of control requests can include a planned successor lane segment and which successor lane segment the human driver took.

As a vehicle is traversing routes (whether based on a current state of a navigation map or without setting a route via the lane-level planner), sensors of the vehicle can be used to collect information to be converted to lane-level information. That is, the vehicle can be thought to be in shadow mode and watching its environment via its sensors.

The data from the sensors can be used to identify, for examples and without limitations, whether roads (and thus, lanes and lane segments) are urban or highways, whether lane segments are difficult to traverse, whether traffic is dense, the level of the density, and so on. Difficulty of traversal can be identified based on the amounts of driver overrides. That is, the number of times that automated driving decisions is overridden or corrected by a human or the number of times that a human directs the automated control to control the vehicle in a different way than that proposed by the automated control.

Burden information can indicate a level of stress that a user (e.g., an occupant of the vehicle) may be subjected to given a selected lane change decision. To illustrate, a particular route may require that the vehicle move left by three lane segments within a relatively short period of time or short distance in a congested or high speed traffic area. Such a situation can be stressful to the user. Such burden information may be used to select lane segment transition points that are far earlier in advance of the congestion areas or to select a route that avoids the stressful situation altogether.

The lane-level information can be used to perform counting so that the counts may be converted to the probabilities. For example, and without loss of generality, a count of the density of traffic can be converted into a probability of moving from one lane segment to another, such as the time it takes to traverse one lane segment in a road and move to the next lane segment; a count of the number of times in the history that there has been light traffic vs. dense traffic on a lane segment can be used to determine a probability of traffic density; a count of the number of times that the speed on a lane segment is high can be used to classify a lane segment as being high speed; a count of the number of times that speed on a lane segment was within −10 miles of the speed limit can be used to determine a probability of the lane segment being a comfortable lane segment; and so on.

The navigation map can be built from the probabilities. That is, the navigation map can incorporate the probabilities. The navigation map is the transition graph as described with respect to FIG. 4. In obtaining a policy, a next action (e.g., move straight to the next lane segment, move to the left-neighboring lane-segment, etc.) can be determined based on the lane-level information (e.g., probabilities). To illustrate and without loss of generality, the next action can be determined probabilistically (or deterministically) based on the probabilities of the neighboring lane segments described herein including, for example, the probabilities of the neighboring lane segments being congested based on whether the current lane segment is congested or not.

At least some of the lane-level information of the navigation map can be used to set objectives for the lane-level route planner. To illustrate and without limitations, as mentioned, the environment can include traversal difficulties and when an objective is (such as set by a user) to maximize automated driving, then the route planner would avoid lane (or lane segments) with traversal difficulties. That is, the route planner policy would be calculated so as to avoid lane segments with traversal difficulties.

Consider the objectives for time to destination (which can include or incorporate speed limit, road length, stop lights, traffic density, whether lane segment are high speed lanes, and the like), preference (which can include a user preference for at least some of comfort, urban as opposed to highway roads, energy consumption, and the like), and competence (which can include whether lane segments can be competently automatically traversed or competently manually traversed).

To illustrate and without limitations, to be able to plan routes using at least a subset of the time, preference, and competence objectives, whenever a vehicle drives on a route, the times to automatically traverse particular lane segments can be recorded with and without full stops. Similarly, the times to manually traverse (i.e., when a human drives on) the particular lane segments can also be recorded. As such, four average time durations can thus recorded. The average times can be used to define the TMDP state transitions for self-looping (stops). The average times can be used to define the rewards/costs for traversal time, such as based on state: automated driving (e.g., control) vs. manual driving.

Additionally, whenever the human drives on a lane segment, successor lane segments can be recoded. The successor lane segments can be used to define the rewards/costs for the preference in the range of [0, 1], which can be the ratio of times that the human drove a road or lane segment.

Furthermore, whenever the human overrides the automated control or the vehicle, under automated control, gets stuck (i.e., does not advance in more than a first threshold of time, such as 1 minute or some other threshold of time, then a first value of −1 can be recoded; otherwise (e.g., when the automated control is not overridden and the vehicle does not get stuck), a second value of 0 can be recorded. The average of the recoded first values and second value can be used as a measure of the competence. The converse can be used to learn the human driver's competence. For example, under manual control, if the vehicle does not move in more than a second threshold of time (e.g., 1 minute or some other threshold of time), then a third value of −1 can be recorded. For example, if the driver does not follow a proscribed next action that is identified by the lane-level route planner, then a fourth value of −1 can be recorded. For example, if the driver seamlessly proceeds to a neighboring lane segment, then a fifth value of 0 can be recorded. An average of the third, fourth, and fifth values can be recorded as a measure of the competence of a human to take a next action when the vehicle is at current lane segment.

As already mentioned, semantics labels can be used to define objectives for a route to be calculated by the lane-level route planner. Examples of semantic labels include those described with respect to FIG. 5 such as "comfort" (and/or any related semantic concept), "urban" (and/or any related semantic concept such as "highway"), "high speed" (and/or any related semantic concept), "manual driving" (and/or any related semantic concept such as "automated driving"). Fewer, more, other semantic labels, or a combination thereof are possible. To illustrate, if the user indicates a preference for comfortable roads, then the lane-level route planner would calculate a policy considering the lane segments labeled "comfortable."

It is noted that there the mapping from objective to semantic label need not be a one-to-one mapping. As such, a semantic label may combine several objectives or a one objective may be used to define one or more semantic labels.

In an aspect of the disclosed implementations, use multi-objective deep reinforcement learning (MODRL) can be used. In reinforcement learning or deep reinforcement learning, a deep neural network (DNN) can be used to learn the policy. The DNN can be alternatively or additionally used to learn the value functions. As such, reinforcement learning techniques can be used instead of planning techniques. In reinforcement learning, the objectives can be learned via the DNN from feedback. The feedback can include one or more of the time to traverse a lane segment, human overrides for competence, or other feedback. In reinforcement learning, instead of learning the probabilities, the probabilities and the costs are combined into the expected values of getting to the goal (i.e., a destination).

In an aspect, and as described herein, a TMDP can use the navigation map to obtain a policy. In another aspect, a TPOMDP can be used to obtain the policy. Using a TPOMDP enables a belief over, for example and without limitations, the level of traffic on a road, lane, or lane segment; the amount of competence for a new road, lane, or lane segment; or other lane-level information described herein.

Figure 6:
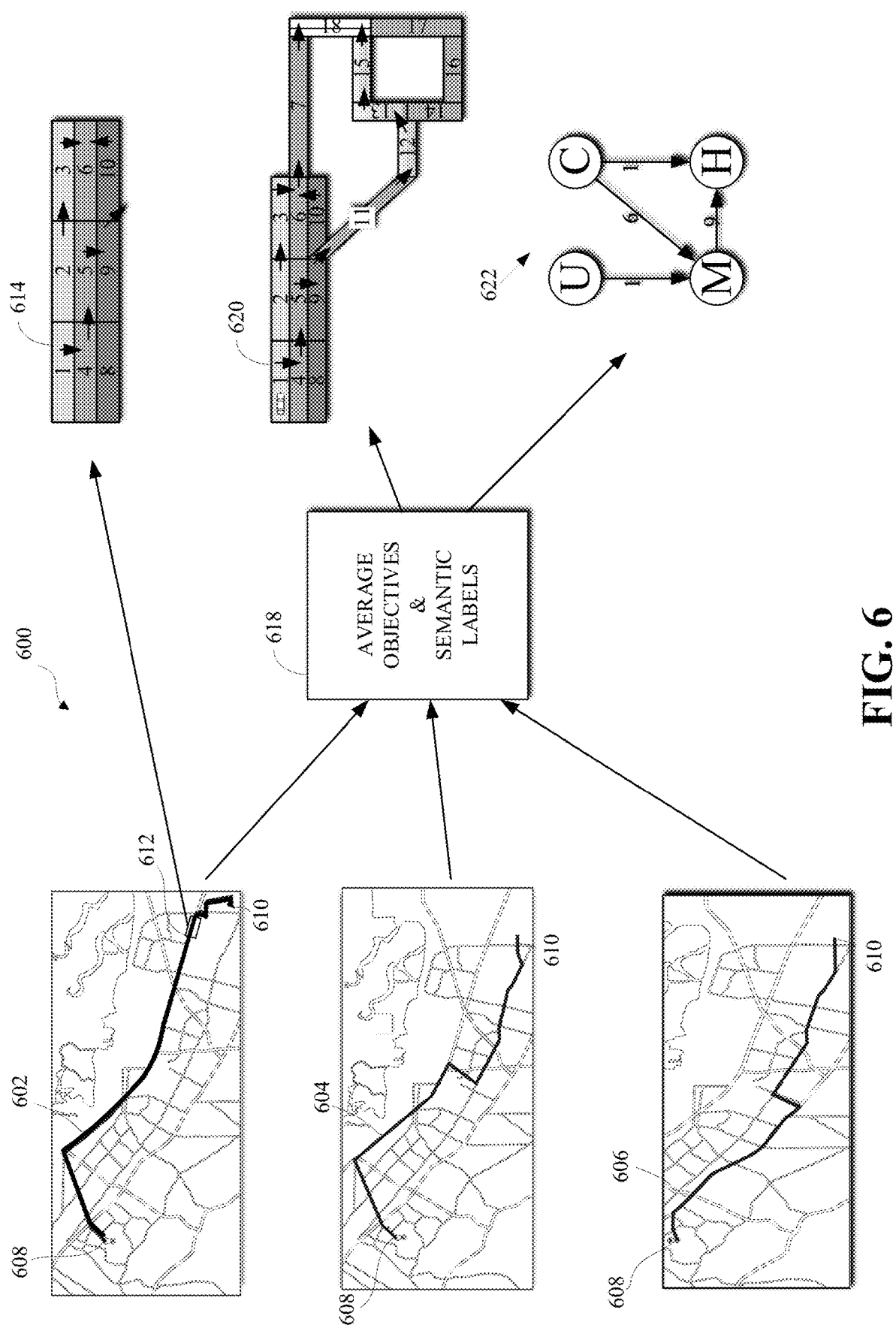
FIG. 6 illustrates a summary of learning and using a navigation map according to implementations of this disclosure.

FIG. 6 illustrates a summary 600 of learning and using a navigation map according to implementations of this disclosure. A lane-level route planner can include a learning module that obtains lane-level information. The lane-level route planner can be executed in a vehicle and the lane-level information can be incorporated in the navigation map of the vehicle. The lane-level information can be transmitted to a server, which may receive lane-level information from multiple vehicles. The server can incorporate the received lane-level information into the navigation map. The navigation map can then be used a lane-level route planner to obtain a policy (e.g., a route).

The summary 600 shows that three different routes 602, 604, and 606 were taken (by the same or more than one vehicle, not show) from an origin 608 to a destination 610. During the drives, lane-level information is collected for lane segments, such as lane segments 612. A history 614 indicates the learned lane transitions and the shading of the lane segments in the history 614 indicates learned characteristics of the lane segments. The history 614 includes other lane segment information learned as described herein.

The histories of at least some (e.g., all) of the lane segments along at least some (e.g., all) of the routes can be combined (e.g., counted, etc.) into the navigation map, as described herein. As described herein, multiple objectives and other semantic labels can be recorded in each lane segment history, as illustrated by a box 618.

Based on the learning, a state transition graph structure (i.e., the state transition function T, described above), illustrated by a transition graph 620, can be generated. The state transition graph can be used by an SSP MDP or POMDP model as described herein. The navigation map for the lane-level multi-objective lane-level route planner is then output (e.g., generated, etc.). The lane-level information of the navigation map includes the average of all the traversals of the vehicle of the lane segments. For example, the lane-level information includes one or more averages of speed, stop, density of perceived traffic, battery usage, lane change success rate, and so on.

Based on the learning, a cost (reward) function can also be generated for use in the SSP MDP or POMDP model. The average of different objectives can be recorded as the rewards, observing the times, transfer of control points, battery usage, speeds, and so on as described above. From the reward function, it can be known whether a slack is possible or not between objectives. For example, if a route takes an expectation of 10 minutes longer than the optimal, then a slack of at least 10 is possible. Such a reward function and slacks can be used to set preference orderings, as described with respect to FIG. 5 and illustrated with a preference ordering 622.

Figure 7:
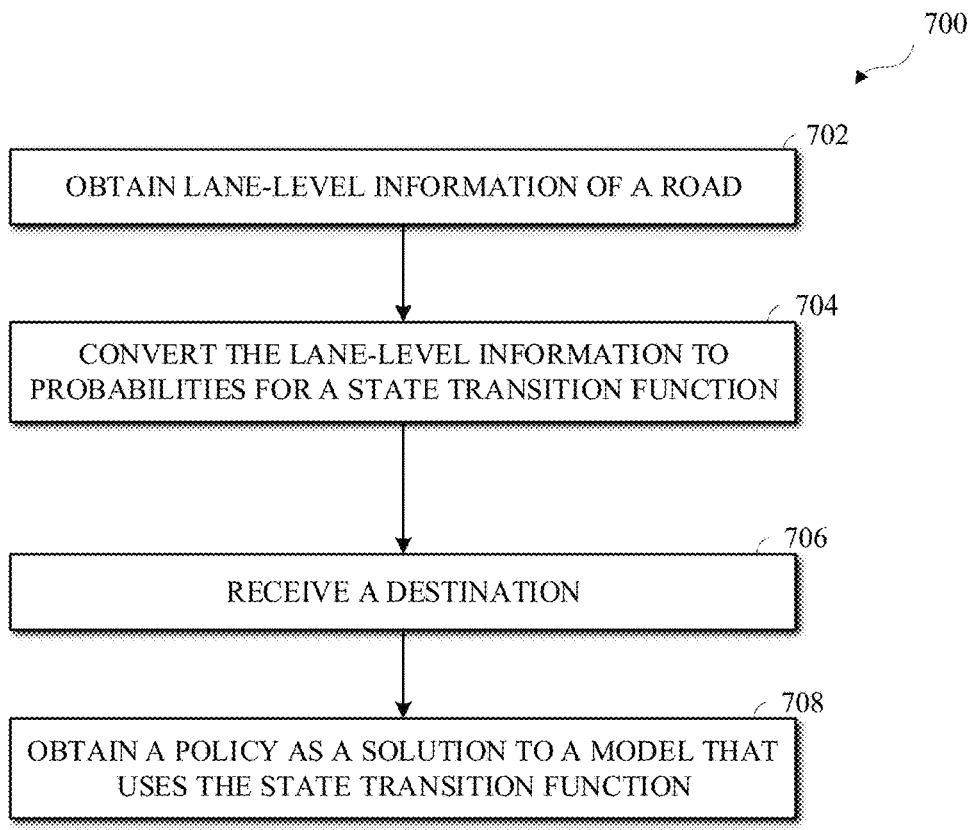
FIG. 7 is a flowchart diagram of an example of a technique for learning a navigation map for route planning in accordance with an embodiment of this disclosure.

FIG. 7 is a flowchart diagram of an example of a technique 700 for learning a navigation map for route planning in accordance with an embodiment of this disclosure. The navigation map is then used by a lane-level route planner. The technique 300 can be partially or fully implemented in an apparatus, which can be a host vehicle such as the vehicle 100 shown in FIG. 1, one of the vehicles 210/211 shown in FIG. 2, a semi-autonomous vehicle, any other vehicle that may include drive-assist capabilities, or a vehicle that is manually controlled, such as by a driver. The apparatus can be a server can be the communication device 240 of FIG. 2.

The technique 700 can be implemented as instructions (e.g., operations) that are stored in a memory. The memory can be the memory 134 of FIG. 1. The memory can be a memory of the server. The instructions can be executed by a processor, such as the processor 133 of FIG. 1. The technique 700 can be implemented using specialized hardware or firmware. Multiple processors, memories, or both, may be used.

At 702, the technique 700 obtains lane-level information of a road. The lane-level information includes information of different segments of different lanes of the road. For example, the road can include a first lane and a second lane. The lane-level information includes first lane information related to the first lane and second lane information related to the second lane.

The lane-level information can be obtained at a host vehicle and the lane-level information can be used to evolve the navigation map of (e.g., used in, used by, available at, etc.) the host vehicle. The lane-level information can be obtained (e.g., received, etc.) at the server, which obtains lane-level information from several vehicles. The server can transmit an evolved navigation map to vehicles for use by their respective lane-level route planners. The server can use the evolved navigation map to calculate routes (e.g., policies).

As described above, the lane-level information can include at least one of environment information, vehicle information, or human information. The environment information can include at least one of traffic patterns, pedestrian patterns, or traversal difficulties information of lane segments. The vehicle information can include preferred routes of a user and transfer of control requests by the user.

In an example, obtaining the lane-level information of the road can include recording first times of automated traversal of the road with stop on the road; recording second times of automated traversal of the road without stops on the road; recording third times of manual traversal of the road with stop on the road; and recording fourth times of manual traversal of the road without stops on the road. In an example, obtaining the lane-level information of the road can include recording successor lane segments during manual traversal. In an example, obtaining the lane-level information of the road can include recoding overrides by a human of an automated travel control. Automated traversal of the road means that the vehicle is automatically controlled to traverse the road. Manual traversal of the road means that the vehicle is manually controlled (such as by a human) to traverse the road.

At 704, the technique 700 converts the lane-level information to a state transition function that can be used to obtain a route to a destination. As described above, the state transition function can be that of a TMDP or TPOMDP model. The route to the destination can be, or can be encapsulated in a policy, as described above. In an example, the policy, and thus the route, can be stochastic.

At 706, the technique 700 receives a destination. For example, the server (more specifically, a lane-level route planner executing at the server) can receive (such as from a user device, a mapping application of a vehicle, or the like) a current location and a destination, can obtain a route. For example, the lane-level route planner executing at the apparatus can receive the destination from a user (such as a driver or an occupant) and the lane-level route planner can obtain a route. In some example, the lane-level route planner can infer the origin location for the route, such as based on a current location of the apparatus.

At 708, the technique 700 obtains a policy as a solution to a model that uses the state transition function.

Figure 8:
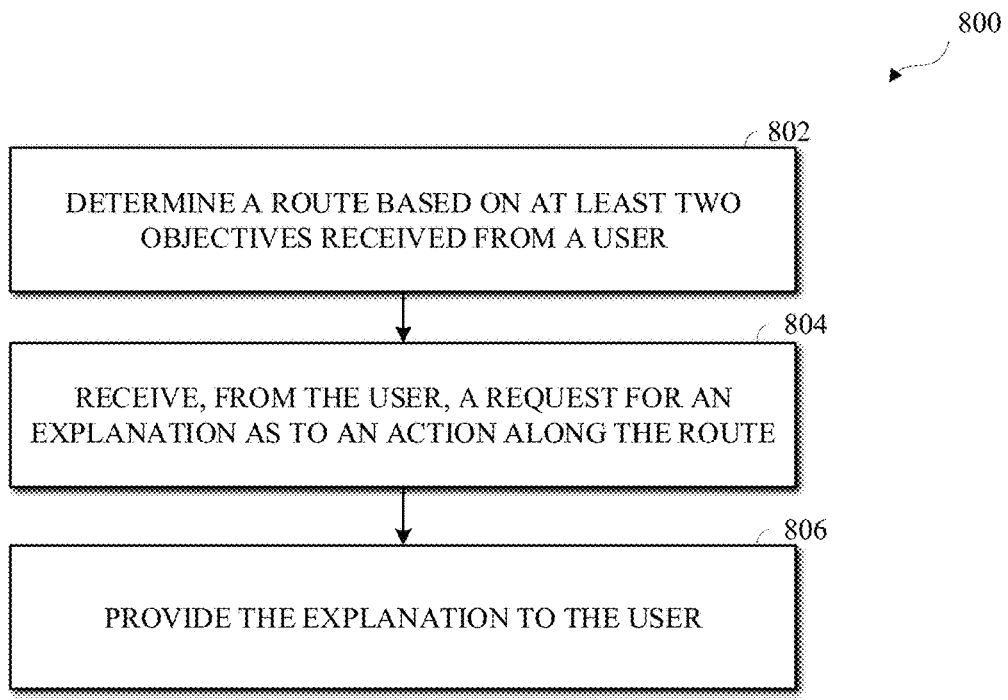
FIG. 8 is a flowchart of an example of a technique for providing explanations in route planning according to implementations of this disclosure.

FIG. 8 is a flowchart of an example of a technique 800 for providing explanations in route planning according to implementations of this disclosure. The technique 800 can be implemented, partially or fully by a route planner, such as a lane-level route planner as described herein. The technique 800 can be implemented by a module of the route planner, such as an explainer module. The lane-level route planner can provide action that can be used for controlling a vehicle to automatically follow the route. The technique 800 can be used to provide explanation as to why a certain road, lane, or lane segment is selected by the route planner.

The technique 800 can be implemented as instructions (e.g., operations) that are stored in a memory. The memory can be the memory 134 of FIG. 1. The memory can be a memory of a server. The instructions can be executed by a processor, such as the processor 133 of FIG. 1. The technique 700 can be implemented using specialized hardware or firmware. Multiple processors, memories, or both, may be used.

Figure 9:
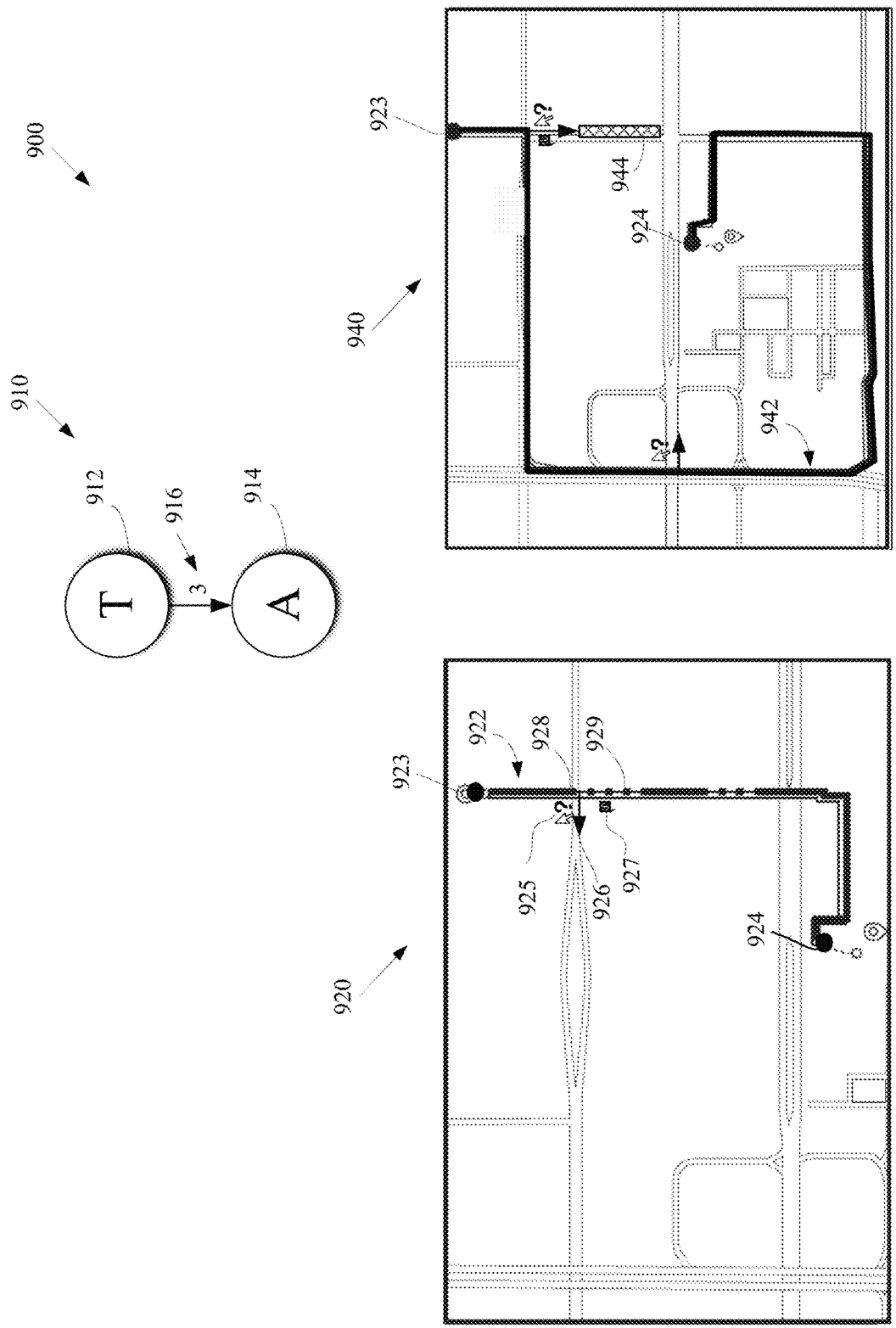
FIG. 9 is a diagram of an example of providing explanations based on multiple objectives according to implementations of this disclosure.

The technique 800 is further described with reference to FIG. 9. FIG. 9 is a diagram of an example 900 of providing explanations based on multiple objectives according to implementations of this disclosure.

At 802, the technique 800 can determine (e.g., calculate, obtain, etc.) a route based on at least two objectives received from a user. The second objective of the at least two objectives can be constrained to within a slack value of a first objective of the at least two objectives. As described above, the slack value indicates how much deviation from the first objective is allowed to improve the second objective.

In an example, determining a route can mean obtaining a policy for navigating a route from an origin (e.g., current) location to a destination location. The route can be determined using a Markov decision process, as described herein. A lane-level planner, as described herein, can determine the route. The lane-level route planner can use a navigation map, as described herein, to determine the route. The route planner can be a multi-objective route planner.

The at least two objectives can be any number of objectives. The at least two objectives can be related (e.g., constrained, etc.) in any way, as described herein. The at least two objectives can be related using a directed acyclic graph. In an example, the at least two objectives can include at least two of a time objective, a comfort objective, an autonomy objective, or an urban objective.

A directed graph 910 of FIG. 9 illustrates two objectives: a time objective 912 and an autonomy objective 914. The autonomy objective 914 is constrained to (e.g., to be) within a slack value 916 of 3 minutes of the time objective 912. In an example, the at least two objectives can be a default setting of the route planner. In an example, the technique 800 can receive, from the user, the first objective, the second objective, and the slack value.

In an example the first objective, the second objective, and the slack value can be received from the user in a verbal command. For example, the verbal command may be "find me the fastest route allowing for 3 minutes of slack to increase autonomy." The verbal command can be converted, via a semantic processing module of the route planner, to an internal representation that is, or can be similar to, the directed graph 910. The semantic processor can identify the objectives, the relationships between the objectives, and any slack values in the verbal command. For example, the semantic processor may convert the words "fastest route," "increase autonomy," and "allowing for 3 minutes of slack" to the time objective 912, the autonomy objective 914, and the slack value 916, respectively.

In an example, the user can be provided with a graphical user interface via which the user can specify the objects and the slack values. Examples of graphical user interfaces are described with respect to FIGS. 10 and 11. The graphical user interface can be provided on a display, such as a display of the vehicle, or a display of a device of the user. The graphical user interface can present a drag-and-drop interface where the user can drag icons (e.g., bubbles, boxes, words, etc.) representing the available constraints, connect the icons to form DAGs, such as those described with respect to FIG. 5. By clicking a connection between two constraints, the user can provide slack values. In an example, the semantic processor of the route planner can convert a DAG into a statement that can be displayed on the display. In an example, the user can be limited to forming DAGs that are lists (e.g., sequences of objectives).

In an example, the verbal command of the user can be displayed textually on the display. In an example, a DAG representing the verbal command of the user can be displayed on the display.

At 804, the technique 800 receives, from the user, a request for an explanation as to an action along the route. The request can be for an explanation as to an action that has yet to be taken or an action that was already taken.

The determined route can be displayed on the display. The route can be overlaid on a map, such as shown in a map 920 of FIG. 9. The map 920 includes a route 922 from an origin 923 to a destination 924. The origin 923 can be a current location of the vehicle and can be updated as the vehicle traverses the route 922.

The map 920 indicates that a next segment to be taken is a lane segment 929. The map can also include controls, which the user can use (e.g., press, etc.) to obtain information or to obtain an explanation. For example, the map 920 include an alternate lane segment selector 926, which the route planner could have selected. In response to the user pressing an explainer control 925, the technique 800 provides the explanation. An information control 927 can be used by the user to request information on lane segment, lane, or road that the information control 927 is displayed next to. In response to the information control 927 being pressed, the technique 800 can provide the information about the lane segment that is available in the navigation map, as described above. Other placements or visual depictions of the explainer control 925, the alternate lane segment selector 926, and information control 927 are possible.

In an example, the technique 800 can receive the request for an explanation via a verbal request form the user.

The request for the explanation can be a request about a particular possible action at a current state. For example, the user may ask "why wouldn't you go right?" to receive an explanation as to the next immediate action chosen by the route planner. With such a request, the route planner provides an answer by comparing the selected action in the current state of the route planner to the particular possible action.

The request for the explanation can be a request that encompasses all possible actions at a current state. For example, the user may ask "why are you going straight?" to receive an explanation as to the next immediate action chosen by the route planner. With such a request, the route planner provides an answer by comparing the selected action in the current state of the route planner to other possible actions at the current state. In an example, the user can select (e.g., click) a particular point on the map, such as a point 928, at which the route planner may select from different possible actions.

The user can request explanation as to an action already performed or selected to be performed by the route planner. For example, the user can ask "why didn't you go right?" In another example, the user can "why did you go straight?"

In an example, the user may manually override an action. The user can manually override the action by selecting (e.g., pressing, etc.) the alternate lane segment selector 926 or by issuing a verbal command, such as "go right, next." The user can manually override the action by manually controlling the vehicle. The user can override the action before or after receiving the explanation.

When the user selects a point on the map 920 to request an explanation, the location on the map is converted to a state s. The state s can be as described above with respect to any of the route planning models.

At 806, the technique 800 provides the explanation to the user. The explanation can describe (e.g., include, etc.) an extent of violating the slack value.

In calculating the route (e.g., the policy), and for at least some of the objectives, the route planner can maintain (e.g., store, etc.), for at least some of the states (e.g., lane segments) and possible actions, as described above, a respective expected discounted reward $Q_o$ (s, a), where o is an objective, s is a state, and a is an action. $Q(s, a)=[Q_1 (s, a), \ldots, Q_k (s, a)]$ is a vector of the expected discounted rewards of the $1, \ldots, k$ objectives for a particular state s and action a. Obtaining the expected discount rewards depends on the policy. $Q_o$ (s, a) can be the expected discounted reward of the objective o for taking action a once in state s, but then following the policy thereafter. As such, for at least an objective of the at least two objectives, respective costs of performing lane segment transitions from a current lane segment can be maintained.

In an example, the route planner can store, amongst the states and for each objective, the gain values by how much change occurs. The top states (e.g., lanes or lane segments along the route) that have the largest difference in value can be selected as the explanation.

To illustrate, the expected discount reward values, Q, can be sorted at a state s over the actions of the expected discount reward values. In an example, the values can be stored for each objective separately. For an objective i, an ordering over the actions may be calculated to be $Q_i(s, a_2)>Q_i(s, a_4)>Q_i(s, a_3)>Q_i(s, a_1)$, where $a_1, a_2, a_3,$ and $a_4$ are the possible actions in state s. As such, action $a_2$ can be considered the optimal action for objective i. However, for another objective j, the ordering may be $Q_j(s, a_4)>Q_j(s, a_1)>Q_j(s, a_2)>Q_j(s, a_3)$. As such, action $a_4$ can be considered the optimal action for objective j. Assume further that the action $a_4$ is the action finally selected for state s. As such, the expected discount reward for objective i decreased by $Q_i(s, a_2)-Q_i(s, a_4)$.

The semantic meanings of the actions $a_1, a_2, a_3,$ and $a_4$ and the states can be used to provide the explanation. States s can be meaningful as map locations. For example, a state s can be a GPS point in the map. For example, the state s can be a GPS point in the map at an intersection. Actions a can also have meanings, such as turn left, turn right, go straight, make a u-turn at the intersection, and so on. As such, an explanatory sentence with placeholders (or variables) can then be constructed. For example, the sentence can be constructed from the template "<action a> was chosen at the <state> because the expected time was only <$Q_i(s, a_{optimal})-Q_i(s, a)$>minutes longer, and that is with <slack> slack allotted." An example of such a sentence can be: U-Turn was chosen at the intersection of Barrows and Watson because the expected time was only 1.2 minutes longer, and that is with 3.0 slack allotted.

To illustrate, the user may ask "why didn't you go right?" That is, the user is asking why wasn't a route 942 of a map 940 selected by the route planner. The technique 800 determines that the state s is the GPS location at the point 928. The technique 800 determines (e.g., calculates, retrieves from a memory or storage, obtains, looks up, etc.) the expected discount reward values for each of the objectives and for each of the actions that the user is asking to be compared (e.g., explained). As such, the technique 800 determines that the gain values for each of the time and autonomy objectives and for each of the go_straight and turn_right actions. Thus, the technique 800 determines $Q_{time}$ (s, a=go_straight) and $Q_{autonomy}$ (s, a=go_straight) corresponding to the route 922, and determines $Q_{time}$ (s, a=go_right) and $Q_{autonomy}$ (s, a=go_right) corresponding to the route 942, where s=GPS location at the point 928.

Assume, for illustration purposes that the following values were determined:

$$\begin{cases} Q_{time}(s, a = go_{straight}) = 2 \text{ minutes} \\ Q_{autonomy}(s, a = go_{straight}) = 1 \text{ minute} \\ Q_{time}(s, a = go_{right}) = 6 \text{ minutes} \\ Q_{autonomy}(s, a = go_{right}) = 4 \text{ minutes} \end{cases}$$

That is, the route 922 is determined to take 2 minutes to traverse and for 1 minute along the route 922, the vehicle can drive autonomously; and the route 942 is determined to take 6 minutes and the vehicle autonomously for 4 minutes along the route 942.

Even though the route 942 results in more autonomous driving therewith satisfying the autonomy objective 914, the technique 800 determines that the route 942 is not within the slack value 916. The time difference between the routes 942 and 922 is $Q_{time}$ (s, a=go_right)–$Q_{time}$ (s, a=go$_{straight}$)=6–2=4 minutes. This time difference (4 minutes) is not within the slack value (3 minutes).

The expected discounted rewards are calculated for states along the alternative routes. As such, the user can request for an explanation regarding any state that may be along the route or along an alternate route. Planning a route probabilistically results in numerous contingency plans being considered. As such, an explanation can be provided as to why certain other routes are not selected. For example, in response to the user selecting on an alternate route, the explainer module can use the sorting algorithm described above, except only on the lanes/roads in the difference between the chosen route and the alternate route. Thus, it will specifically be able to pinpoint what causes the highest cost difference among objectives among routes.

The technique 800 can then construct the explanation. In an example, the explainer module of the route planner can construct the explanation. The explanation can include respective descriptors of the first action, the second action, the first objective, the second objective, and the extent to which the second action violates the slack value.

In an example, constructing the explanation can mean substituting (e.g., inserting, etc.) descriptors for placeholders in a template. In an example, the template can have the format "I went <action taken> because <alternate action> causes <violated objective> to be outside allotted slack of <slack amount> in favor of improving <violating objective>," where each of <action taken>, <alternate action>, <violated objected>, <slack amount>, and <violating amount> is a placeholder for a respective semantic descriptor.

The placeholder <action taken> can be a placeholder for the action selected by the route planner; the placeholder <alternate action> can be a placeholder for the one or more of the alternate actions; the placeholder <violated objective> can be the objective whose value according to one of the alternate actions is not within the slack value of the optimal value; <slack value> can be the slack value; and <violating objective> can be the objective whose value causes the value of the violated objective to not be within the slack value. Thus, using the above example, the explanation can be "I went straight because right causes time to be outside the allotted slack of 3 minutes in favor of improving autonomy."

In an example, more than one template may be available and the explainer module can select one of the templates. In an example, a template may not include one or more of the placeholders described above. A template can be "I went <action taken> because <condition related to lane-segment>" or "I did not <action not taken> because <condition related to lane-segment>." To illustrate, in a case where the user provides a primary objective of maximizing autonomy and the route planner selects route 942 of the map 940, the user may ask "why aren't you going straight?" The route planner selects route 942 because the navigation map includes information indicating that a lane segment 944 typically includes dense traffic and, as such, the vehicle is not competent to autonomously traverse the lane segment. The explanation can be "I didn't go straight because I am not competent to autonomously traverse a lane." In an example, the lane segment may be simultaneously highlighted on the map 940 to indicate to the user the lane segment that the explanation relates to. As mentioned above, in an example, the competence information in the navigation map can be learned. In an example, the competence information may be pre-loaded (e.g., pre-configured) in the navigation map.

In an example, the explanation can be provided (e.g., output to the user) in one or more modalities. The explanation can be provided in at least one of a visual, haptic, or an auditory modality. In the visual modality, the explanation can be displayed to the user, such as on a display of the vehicle. In the auditory modality, the explanation can be read aloud to the user.

Haptic feedback can be useful, for example, to hearing and/or visually impaired users. The haptic explanation can be provided by vibrating one or more physical components (e.g., steering wheel, seat, pedal, etc.) of the vehicle.

Different vibration patterns and locations (e.g., a left side of steering wheel, a right side of steering wheel, a left side of seat cushion, a right side of seat cushion, both sides of the steering wheel, both sides of a seat, etc.) can be used to communicate the different aspects of the explanation. In an example, the steering wheel can be used in those situations where sensors of the steering wheel detect that a person is holding the steering wheel.

Different vibration patterns can be used to convey different values for the template placeholder. The haptic explanation can be of the form "<action taken vibration pattern>---<alternate action vibration pattern>---<violated objective vibration pattern>---<violating objective vibration pattern>." Vibration patterns are represented herein using "R" and "-", where "R" can represent a vibration or a buzz and "-" can represent a pause; alternatively, "R" can represent a high-intensity vibration or buzz and "-" can represent a low-intensity vibration or buzz.

A distinguishing vibration can be available for each action taken. For example, the action "move right," "move left," "go straight," and "move diagonally" can be represented by the vibration patterns "RR," "R-," "-R," and "--" respectively. Similar patterns can be available for the values of the other placeholders. The explanation can be constructed as a sequence of vibrations and pauses where each subset of the vibrations and pauses represents a value of the placeholders. The sequence of vibrations and pauses can be prefixed by a sequence announcing (e.g., indicating, etc.) the start of the explanation.

Figure 10:
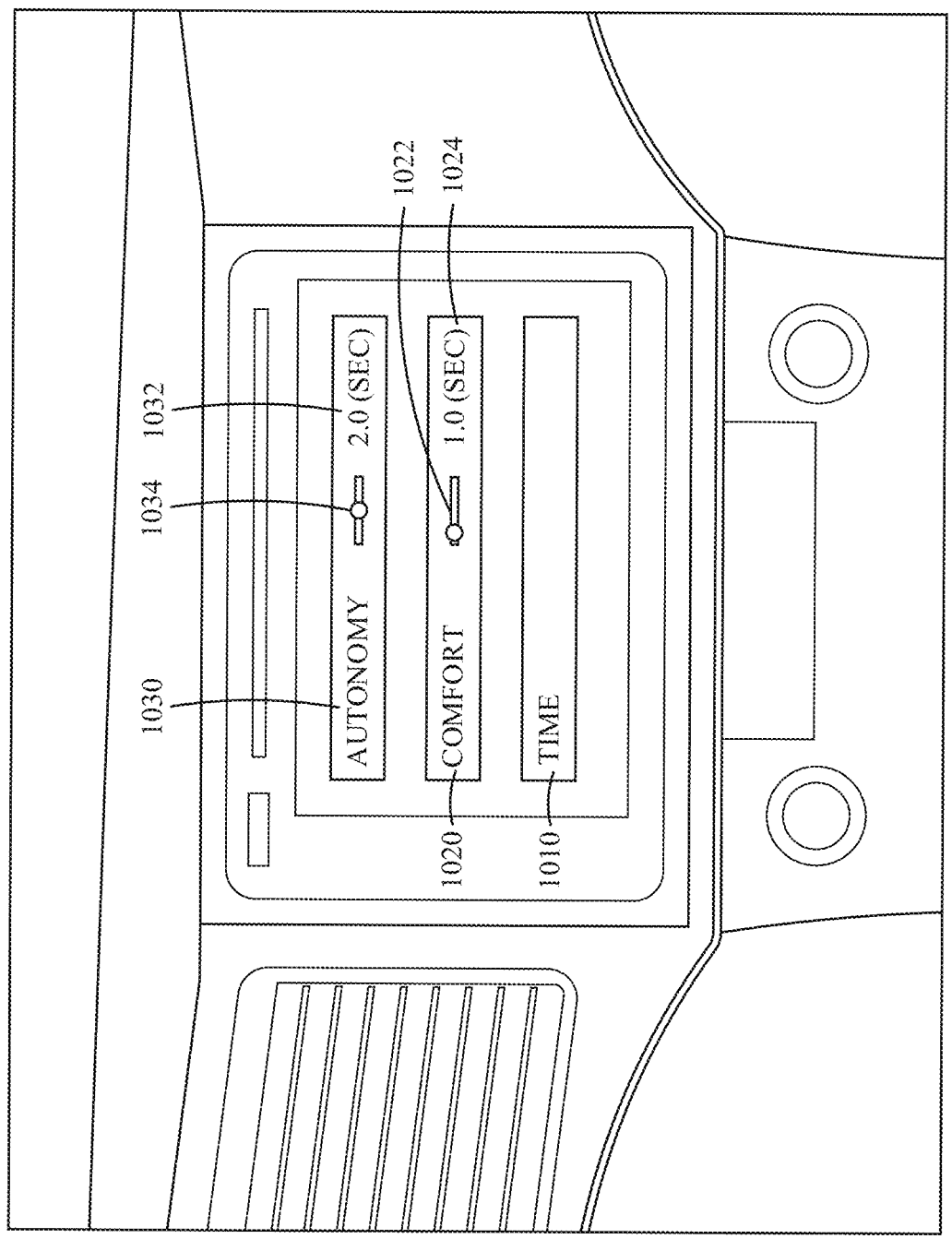
FIG. 10 is a diagram of an example of a user interface for multi-objectives setting for a lane-level route planner according to implementations of this disclosure.

FIG. 10 is a diagram of an example of a user interface 1000 for multi-objectives setting for a lane-level route planner according to implementations of this disclosure. The user interface 1000 comprises a user interface of a vehicle, such as the user interface 135. The user interface 1000 includes a first object 1010 representing the first objective and a second object 1020 representing a second objective. Here, a third objective is included in the multi-objective policy, and so the representation comprises a third object 1030 representing the third objective. An arrangement of the first object 1010 and the second object 1020 within the representation on the user interface 1000 indicates the priority (e.g., relationship, etc.) of the first objective relative to the second objective. Similarly, due to the inclusion of a third objective, the arrangement of the third object 1030 within the representation on the user interface 1000 further indicates the priority of the third objective relative to at least one of the first objective or the second objective.

More specifically, in the arrangement of FIG. 10, the first object 1010, the second object 1020, and the third object 1030 are ordered within a list such that the first object 1010 is located at a bottom of the list, the second object 1020 is located above the first object 1010 within the list, and the third object 1030 is located above the second object within the list. This arrangement indicates that the first objective is constrained by the second objective, and the second objective is constrained by the third objective. Each of the objects 1010, 1020, 1030 can include a descriptor for the respective objective. In this example, the first objective is related to speed or time to complete a goal and has the descriptor "TIME," the second objective is related to a preference of the user for comfortable lanes and has the descriptor "COMFORT," and the third objective is related to a preference of the user for maximizing autonomous driving and has the descriptor "AUTONOMY." In another example, and as described above with respect to FIG. 9, the ordering of the objectives can be such that the unconstrained objective is on the top of the list.

The priority can also include slack values. Via a control 1024 and a control 1034, the user can set a slack value 1024 and a slack value 1032, respectively. In this example, the controls 1022 and 1034 are shown as being sliders. However, other types of controls are possible.

In this example, each of the first object 1010, the second object 1020, and the third object 1030 can be drag-and-drop objects. Feedback in the form of moving any one of the objects within the graphical user interface constitutes a change in the multi-objective policy. For example, swapping the locations of the second object 1020 and the third object 1030 swaps the second objective and the third objective. It is also possible that one or more of the objects 1010, 1020, 1030 can include pull-down menus that select an objective from a group of candidate objectives for association with a respective object. The pull-down menu may allow the change to the multi-objective policy for the lane-level route planner to include changing the first objective by changing the first objective to another candidate objective of the group, changing the second objective to another candidate objective of the group, changing a third objective, when present to another candidate objective of the group, adding a new objective from the group with a priority of the new objective relative another objective, removing an objective, or some combination of these changes.

Figure 11:
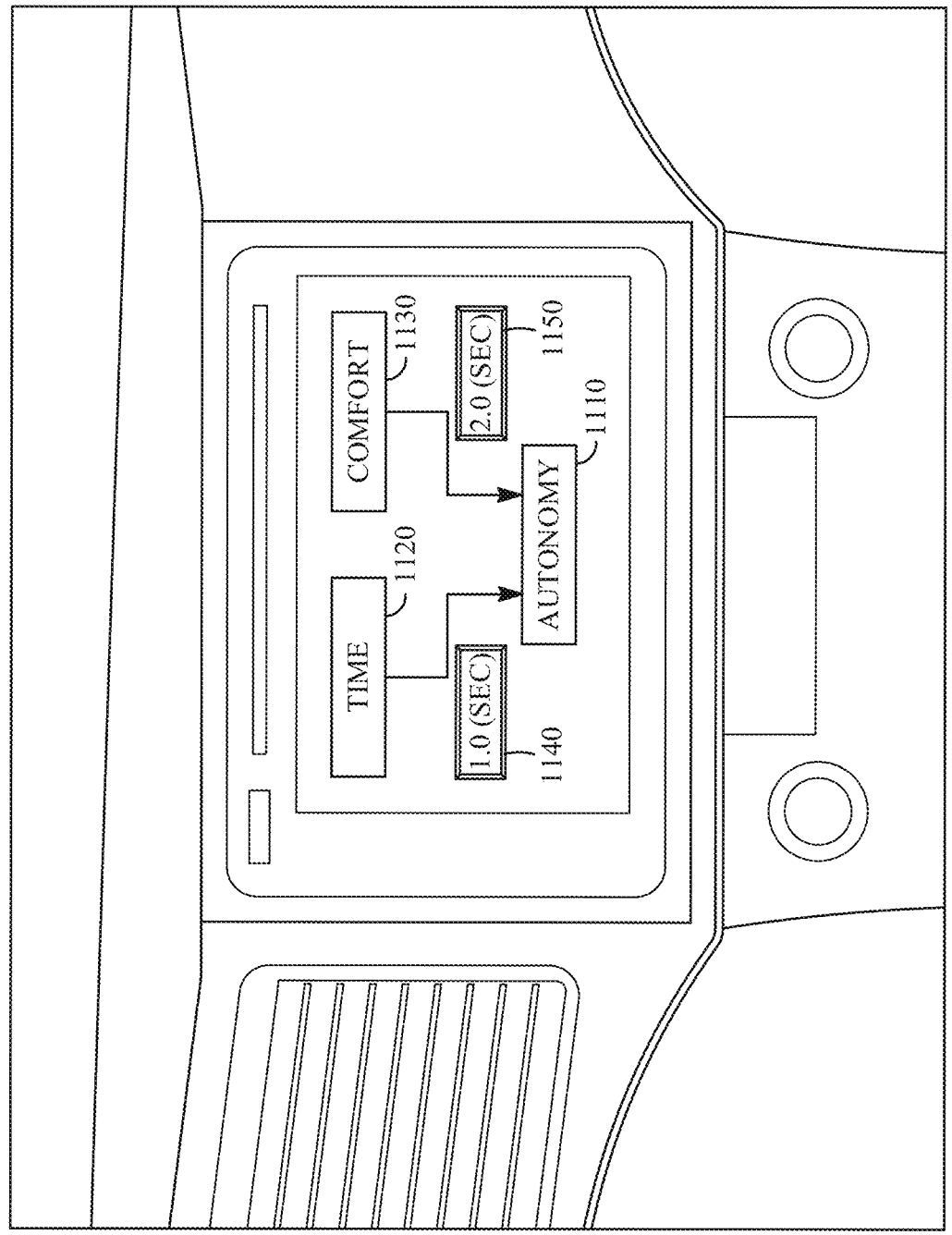
FIG. 11 is a diagram of another example of a user interface for multi-objectives setting for a lane-level route planner according to implementations of this disclosure.

FIG. 11 is a diagram of another example of a user interface 1100 for setting multi-objectives for a lane-level route planner according to implementations of this disclosure. The multi-objectives of the user interface 1100 are arranged in a directed acyclic graph. The user interface 1100 comprises a user interface of a vehicle, such as the user interface 135. The representation comprises a first object 1120 representing a first objective (i.e., "TIME"), a second object 1130 representing a second objective ("COMFORT"), and a third objective 1110 representing a third objective ("AUTONOMY"). An arrangement of the first object 1110, the second object 1120, and the third object 1130 within the representation on the user interface 1100 indicates the relationship (e.g., priority) of the objectives.

In the user interface 1100, the second object 1120 and the third object 1130 are set adjacent to each other in a row in parallel with a top of the graphical user interface, and the first object 1110 located below the second object 1120 and the third object 1130. This graphically represents the priority of the first objective relative to the second objective, and the priority of the third objective relative to the first objective. The first object 1110, the second object 1120, and the third object 1130 can each be drag-and-drop objects as shown, but they may be other objects than can be manipulated via feedback to change the multi-objective policy. For example, one or more of the objects 1110, 1120, 1130 may comprise pull-down menus. The objects 1110, 1120, 1130 can represent other objectives in different implementations.

The representation of FIG. 11 could use objects representing objectives that are formed similarly to those in FIG. 10, that is, objects that include an embedded object (e.g., the embedded object 1024 of the second object 1020 or the embedded control 1034 of the third object 1030) that can be used to adjust the relative priority between two objectives of the multi-objective priority. However, FIG. 11 shows a different arrangement whereby the objects 1110, 1120, 1130 of respective objectives are not used to adjust the relative priority. Instead, the representation includes a fourth object 1140 that identifies the slack value and that, responsive to contact, changes the first slack value. The fourth object 1140 is located between the first object 1110 and the second object 1120 within the user interface 1100. The representation also includes a fifth object 1150 that identifies a second slack value and that, responsive to contact, changes the second slack value. The fifth object 1150 is located between the first object 1110 and the third object 1130 within the user interface 1100.

Each of the fourth object 1140 and the fifth object 1150 in this example can be a pull-down menu. That is, upon contact, a menu can be displayed that includes possible new first slack values or second slack values as applicable. One or more of the objects 1140, 1150 could be a slider or other object that can be manipulated on the user interface 1100 to change a value associated therewith and provide the value to a processor for inclusion in an updated multi-objective policy.

Other indicators of relationships between the objectives may be used in the representation of the multi-objective policy. For example, the representation of FIG. 11 includes an arrow directed from the second object 1120 to the first object 1110 and an arrow directed from the third object 1130 to the first object 1110 that shows the constraining relationships between the respective associate objectives.

Figure 12:
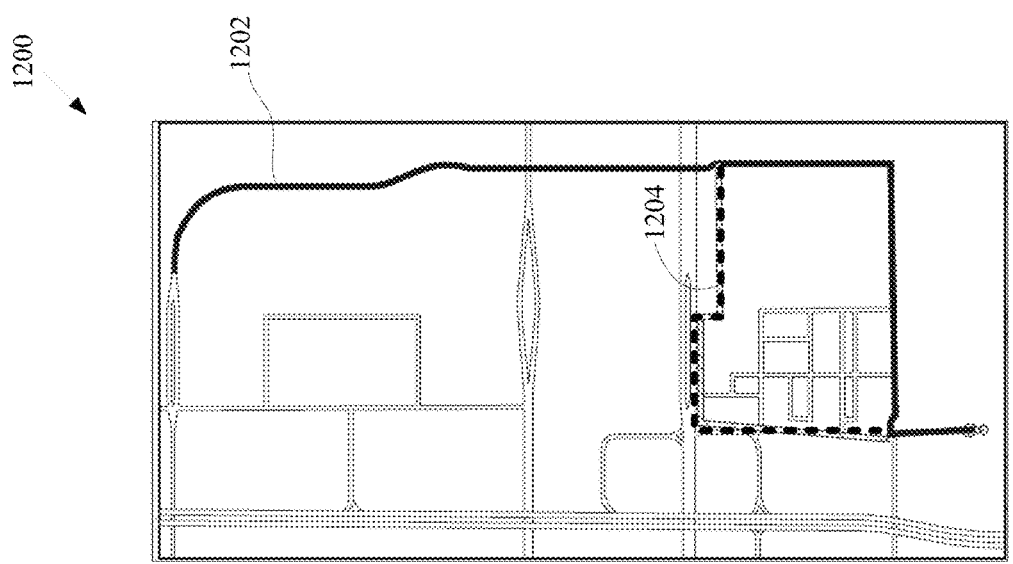
FIG. 12 is an example of a map that illustrates using a standard definition (SD) map for route planning in autonomous driving according to implementations of this disclosure.

FIG. 12 is an example of a map 1200 that illustrates using a standard definition (SD) map for route planning in autonomous driving according to implementations of this disclosure. In the map 1200, a route 1202 is planned by a lane-level route planner using an HD map. A planner, such as a lane-level route planner as described herein, may have selected the route 1202 because, for example, according to the navigation map information, the AV is determined to be competent to autonomously drive the lane segments of the route 1202. Competence on a lane segment can be indicated with a probability, a threshold, a tolerance or the like.

A portion 1204 illustrates unmapped side roads that the planner did not consider because the planner may consider an AV not competent to autonomously drive unmapped roads. Additionally, such side roads may not be available (e.g., not included, etc.) in the HD map. However, it may be that using the portion 1204, if the AV were competent to drive the portion 1204, may lead to a shorter route (e.g., 1 minute shorter). Thus, exploring and mapping the unmapped portion 1204 can be beneficial.

Thus, in aspects of this disclosure, the planner may be configured to explore unmapped roads in order to add HD information for unmapped roads. "Exploring" as used in this context can mean that the route-planner can use roads of the SD map that are not in the HD map for route planning and a vehicle can be controlled to traverse these unmapped routes. In another example, an AV may be directed to traverse a road of the SD map. For example, a user (e.g., a tele-operator, etc.) can send instructions to the vehicle to traverse a road of the SD map. While the AV is traversing the unmapped roads, sensor data can be used to collect HD information. The HD information can be used to construct an HD map or to augment an HD map of the AV. Via the exploration, new road and lane-segment information can be added to the navigation map. At least a partial HD map can be constructed via the exploration. Information regarding lanes, curbs, speed bumps, stop lines, traffic light locations (in a three-dimensional space), and the like can be added to or can constitute the HD map. In some cases, this information may be identical to what might be provided by a commercially available (e.g., purchased) HD map. The quality of the acquired information may depend on the sensors and detection and identification algorithms of the vehicle. However, even noisy information of these kinds of HD features can be useful for decision making and trajectory planning on future traversals of the explored roads of the SD map. One traversal of a road of the SD map can be sufficient for later lane-level route planning for autonomous driving and traversal. More traversals may improve the quality of the HD map for use by decision-making and trajectory planning.

Figure 13:
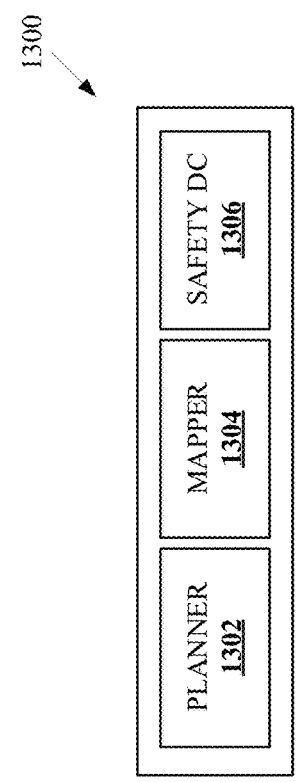
FIG. 13 is a diagram of a system for exploring new roads to improve a map according to implementations of this disclosure.

FIG. 13 is a diagram of a system 1300 for exploring new roads to improve a map according to implementations of this disclosure. The system 1300 can include a planner 1302, a mapper 1304, and a safety decision component (DC) 1306. Other implementations of system 1300 are available. In some implementations, additional components (e.g., elements, modules, etc.) of the system 1300 can be added, certain elements can be combined, and/or certain elements can be removed.

The system 1300 or components therein can be implemented in a vehicle, such as the vehicle 100 of FIG. 1. The vehicle can be an autonomous or a semi-autonomous vehicle. The system 1300 or components therein can be implemented as executable instructions that can be stored in a memory, such as the memory 134 of FIG. 1 and can be executed by a processor such as the processor 133 of FIG. 1. One or more of the components of the system 1300 can implemented by dedicated hardware prepared for executing each information process to be described below.

The planner 1302 can be or can be part of a lane-level route planner. The planner 1302 can weigh the cost of exploration of an SD mapped road versus (e.g., as compared to the cost of) only planning using HD mapped roads. The planner 1302 can be an SSP MDP route planner and the weighting can be incorporated, or can be included in, the cost function of the route planner. The planner 1302 can be a POMDP route planner and the cost can be explicit belief.

The state space of the POMDP model can be given by $S=S_r \times S_t$, where $S_r$ is the set of roads and $S_t$ indicates how traversable the road is. The action space A is the set of actions for choosing a successor road. A successor road can be a road (e.g., a lane segment) of the HD map or a road of the SD map.

The SD map provides at least some of the states (e.g., possible lanes or roads) of the state space $S_r$. Initially, before any road of the SD map is traversed at least once, any lanes of such a road are not yet known. With respect to traversability (e.g., $S_t$), the SD roads can be initially uncertain. For example, the traversability of any given SD road can be set to a small value. As the vehicle is automatically controlled on an road of the SD map, the planner can balance the exploration-vs-exploitation trade-off by its POMDP planning.

In an online lane-level route planner, which may update the route at a certain frequency (e.g., 1 Hz or some other frequency), the traversability $S_t$ of roads may be continually updated. The traversability can be updated at the same frequency as the route. The lane-level route planner may every predefined number of seconds (e.g., 1 second), consider the current road (i.e., the state) in the map based on GPS information and perform planning for a predefined amount of planning time (which may be exactly the predefined number of seconds). After that predefined amount of planning time, the lane-level route planner may provide the best route that the lane-level route planner obtained (based on a calculated policy). As the vehicle is controlled to move incrementally, the lane-level route planner can obtain a new road (which may be the same as the previous road), and updates its previous route plan.

In the case of an offline lane-level route planner, the traversability $S_t$ can be updated in between replanning the route. The offline lane-level route planner may be a cloud-based service that provides route planning.

In an example, the planner can be configured to explore unmapped roads based on an objective provided by the user. The planner can obtain an objective indicating that a standard definition map is to be used in addition to a high definition map for obtaining a route. The objective can be implicit or explicit. The route planner can be configured to choose to explore new roads and to weigh the trade-off between getting to the goal for the customer and trying out a road that the route planner determines that the AV may be controlled to drive on.

For example, the user may indicate a preference for a route that is within 2 minutes of the fastest route. The fastest route would be initially calculated based on HD map. The planner can use the 2 minute slack value as an implicit objective to consider unmapped roads. In an example, the user can provide an explicit objective related to unmapped roads. For example, an available objective that the user can set may be an "exploration objective." The user can provide the exploration objective as described herein. For example, the user can provide (e.g., construct, etc.) a directed graph of objectives that is similar to the directed graph 910 of FIG. 9 where the autonomy objective 914 can be replaced by the exploration objective. In an example, the user can provide the objective using a user interface such as described with respect to FIGS. 10 and 11. If the slack value is set to zero, then only HD routes would be used by the planner to obtain a route.

The mapper 1304 records data from HD sensors of the vehicle, such as the sensor 136 of FIG. 1. The HD sensor data can be recorded as the vehicle is traversing a road of the SD road, before the road is mapped and added to the navigation map. For example, the HD sensor data can include point clouds, images, GPS coordinates, tracked objects, and so on. In an example, data from sensors of other vehicles traversing the road of the SD map can also be obtained, such as at a central server. The data from the sensors of other vehicles can also be used to obtain the HD map data. Thus, more generally, regardless of the source of the sensor data, HD map information can be obtained for roads of the SD map based on sensor data. HD map information obtained at the server can be transmitted to the vehicle.

As such, the mapper 1304 can use the data of HD sensors collected while an SD lane or an SD route segment is being traversed. The HD sensor data can be said to become the HD map for that SD lane or SD route segment. In an example, the SD lane or the SD route segment can be traversed (e.g., driven) by human(s) controlling one or more vehicle equipped with HD sensors to obtain the HD map for the SD lane or an SD route segment. The obtained HD map can be improved by revisiting (i.e., re-traversing) the SD lane or the SD route segment.

The sensor data can be used to identify features of the road. For example, object detection, appearances, or disappearances can be detected from the sensor data. For example, for every detection segment of the road (e.g., 1 meter, 2 meters, or some other detection segment) of the SD road, data indicating whether an object is present or not, an identity (e.g., a type) of the object (if recognized, such as using image processing or data analysis), whether an obstacle is present, a location (e.g., left, right, center, some other position of the road) of the object or obstacle, a during the object was present before it disappeared, and so on.

The data collected from multiple traversals (such as traversals of the vehicle or multiple traversals) of the road of the SD map can be aggregated to obtain state probabilities that can be used for obtaining routes for autonomous driving on SD roads. Illustrative examples of the probabilities can include that an object appears at a first location with a probability of 0.823, an object appears at a second location with a 0.1 probability, an object that is at a third location moves with an average speed of 3.5 miles-per-hour, the object at the third location is classified as a child with a probability of 0.9, and so on. Such probabilities can be used for trajectory planning. The probabilities can be compounded over the length of the road or segments of the road to calculate a trajectory for traversing the road.

The probabilities can be initialized to values indicating the uncertainties (i.e., lack of knowledge). The probabilities can be updated based on the sensor data collected during traversals of the roads of the SD map.

Information regarding types of decision components (DCs) that may be encountered on the road of the SD map can be identified using the sensor data can also be recorded. Information regarding decision component (DC) types that may be required (e.g., instantiated, etc.) to traverse the road. Examples of DC components may include DC components for crosswalks, for intersections, for parking lots, and so on. Decision components are described in U.S. patent application Ser. No. 16/696,235 filed on Nov. 26, 2019 and Ser. No. 16/778,890 filed on Jan. 31, 2020, the entire disclosures of which are incorporated herein by reference.

A decision component can be directed to (or can) solve a particular aspect (e.g., an operational scenario) of a scenario in autonomous driving. The DC can provide actions for controlling the AV.

A decision component can be an instance of a decision problem. A decision problems describes a potential pairwise interaction problem in a scene. A decision problem can be a specific abstract problem in autonomous driving that is known a priori and solved offline to provide an action of autonomous driving (e.g., stop, edge, go, pass on right, pass on left, etc.) given a current state of the environment. The decision component can be created (i.e., instantiated from a solved decision problem) online while driving when the operational scenario that the decision problem solves is encountered. In an example, a decision problem and a corresponding decision component can be as described below with respect to scenario-specific operational control evaluation modules and instances thereof. Examples of operational scenarios include pedestrian scenarios, intersection scenarios, lane change scenarios, or any other vehicle operational scenario or combination of vehicle operational scenarios, corresponding to the external objects. In an example, the decision component can be a Markov decision process or a partially observable Markov decision process.

A scenario-specific operational control evaluation module may be a model, such as a Partially Observable Markov Decision Process (POMDP) model, of a respective operational scenario. That is, each model can be configured to handle a specific scenario. The autonomous vehicle operational management controller may instantiate respective instances of the scenario-specific operational control evaluation modules in response to detecting the corresponding operational scenarios.

To restate, the POMDP of a particular operational scenario may be solved a priori (e.g., off-line) to generate a policy. The policy can include one or more actions for controlling an AV given a currently observed and/or predicted state. Upon encountering the particular operational scenario during autonomous driving (e.g., online), the POMDP can be instantiated and its policy used by the instance to provide, at each time step, a respective action for controlling the AV based on the observed and/or predicted state at the time step.

An autonomous vehicle operational management controller may receive candidate vehicle control actions from respective instantiated scenario-specific operational control evaluation module (SSOCEM) instances, may identify a vehicle control action from the candidate vehicle control actions, and may control the autonomous vehicle to traverse a portion of the vehicle transportation network according to the identified vehicle control action.

The DC information determined based on the HD sensors and the newly generated HP ma of the road of the SD map can be used in subsequent planning by the lane-level route planner, as described above, to predict traversal times based on the DCs the vehicle may encounter on the road. As such, the vehicle can include (not shown) the DCs such as in a memory of the vehicle, as executable instructions stored in the memory, or as specialized hardware.

The safety DC 1306 can make risk-aware decisions. The safety DC 1306 can obtain risk-aware decisions by monitoring careful navigation on an SD-mapped road towards HD-mapped roads. An overall purpose of the safety DC 1306 is to provide actions that constrain the trajectory of the vehicle on the road of the SD-map to ensure safe traversal by considering belief-based interactions over if obstacles exist, block the path, and might move to interact with the vehicle. The actions provided (e.g., selected, etc.) by the safety DC 1306 can be provided to a controller, such as the controller 130 of FIG. 1, for controlling actuators of the vehicle to traverse the road of the SD map. As the road of the SD map may be risky to autonomously traverse due to the lack of HD map detail, the safety DC 1306 can be used to determine whether autonomously traversing the road should continue or stop. If the safety DC 1306 determines that autonomously traversing the road should stop, a tele-operator request may be initiated so that the tele-operator can remotely control the vehicle to traverse the rest of the road. In an example, the safety DC 1306 can direct a user (e.g., a driver) of the vehicle to take manual control of the vehicle.

When the vehicle is traversing the road, the safety DC 1306 can, at each time step, determine whether it is safe to continue traversing the road or not. The safety DC 1306 can be a Markov decision process, such as an MDP or a POMDP.

The safety DC 1306 can determine the speed for the next time step and can select an action (e.g., go left, go right, go straight, stop, etc.). The safety DC 1306 can choose the speed or direction based on a direction of the nearest HD map lane.

In an example, the safety DC 1306 can determine actions for traversing a drivable area of the road. The drivable area of the road is the area of the road where the AV can be safely operated. Determining a drivable area can be as described in PCT Patent Application No. PCT/US2018/035441, filed May 31, 2018 and titled Trajectory Planning, the entire disclosure of which is incorporated herein. Accordingly, obtaining the drivable area can be as follows. Initially, the drivable area may include areas (e.g., the whole road within a look-ahead window) where the vehicle cannot be predicted to be safely driven. Static and dynamic (e.g., moving) objects can be detected (e.g., sensed, observed, etc.) based on sensor data of the vehicle. Those areas where the vehicle cannot be predicted to be safely driven can then be cut out (e.g., excluded, carved out, etc.) of the road. Portions of the road where static objects are located (e.g., observed, detected, etc.) are first removed from the drivable area. The drivable area can be adjusted further for dynamic objects. Portions of the drivable area can be further cut out based on the respective predicted trajectories of each of the dynamic objects. The future locations of the vehicle can be evaluated against future anticipated (e.g., predicted) locations of the dynamic (i.e., identified moving) objects. The drivable area of the vehicle can then be adjusted to remove areas of the drivable area that correspond to (e.g., overlap) locations of the dynamic objects.

The drivable area can be further adjusted by forming a tunnel around the vehicle through which the vehicle is to be controlled to traverse the road. The tunnel can be considered as further limiting the drivable area. A left border and a right border can be laterally extended along the left and right sides of the vehicle. The left border and the right border may be a defined distance from the left and right sides of the vehicle. The defined distance may be based on a desired clearance of the vehicle from likely external objects. For example, a door of a parked vehicle can open. As the maximum size of a car door is approximately 1 meter, the defined distance between the vehicle and each of the left and right borders may be 1 meter. The defined distance may be based on predefined spacing tolerance. The defined distance may vary, such as to take into account the presence of external objects. For example, the defined distance may be a first value when no external objects are detected by the vehicle, and may be a second value smaller than the first value when an external object is detected. The left border and the right border may be spaced apart from the vehicle, and hence the vehicle, by different distances (e.g., where there is an external object to one side of the vehicle, but not the other, or where there are two different external objects on opposite sides of the vehicle that result in two different defined distances).

The safety DC 1306 can be used to navigate the road of the SD map (while learning HD map from sensors). The safety DC 1306 can provide time-step to time-step (e.g., second-to-second) constraints for a trajectory along the road.

The state space of the safety DC 1306 can be given by $S=S_l \times S_m \times S_b$, where $S_l$ is the set of locations along the road of the SD map, $S_m$ indicates whether motion is detected (such as motion of dynamic objects such as other vehicles, pedestrians, bicycles, etc.) at those locations, and $S_b$ indicates whether obstacles (e.g., static objects) are detected at those locations. Said another way, the state space S considers the location along the road of the SD map $S_l$, if there is motion at location $S_m$, and if there is an obstacle at that location $S_b$. It is noted that the lanes of the road are not known (e.g., mapped) yet.

The action space of the safety DC 1306 can be given by $A=A_m \times A_o$, which considers an action and a direction. $A_m$ describes movements, such as "stop," "edge," and "go." $A_o$ describes orientation adjustment actions, such as "left of lane" "center of lane," and "right of lane."

With respect to the transition function of the model, the $S_l$ state factor can transition forward with a probability proportional to a distance or a speed limit. For example, if the maximum traversal time to traverse an edge in the map is $t_{max}$ (e.g., 42.23) seconds, then this maximum traversal time can be used as a normalizing scale so that the probability of the maximum traversal time transition is 1. All other transitions with time to traverse of t can then move forward with probability $t/t_{max}$. Similar calculations can be performed using other variables, such as the speed limit or a distance of road. Alternatively, the transition probability can be set to a constant 1.0 indicating to always go forward (during the planning stage).

The motion detected state factor, $S_m$, and the obstacle detected state factor, $S_b$, can be derived from historical data of arrivals or quantities of other forms of road users. To illustrate, if a bicycle lane is detected on a road being explored (or the bicycle lane is already known in the SD map), and it is known from historically driven routes that roads with bicycle lanes have bicycle arrivals with a probability 0.123 per minute, then such historical information can be used to transition $S_m$ from no bicycle to having a bicycle: (1−0.123=0.877) can be the probability of remaining at no bicycle. The state factor $S_b$ can be similar to the state factor $S_m$ but is used for a static version of one type of object. The same principles can be applied for vehicles, pedestrians, and other objects that may be detected.

The state factors $S_m$ and $S_b$, can have binary values of 0 and 1 for moving and/or blocking objects, respectively. Binary values of the state factor values $S_m$ and $S_b$ may be sufficient for estimating safety and traversability. In another example, additional of alternative state variables can be used. For example, state variables indicating numbers (e.g., cardinalities) of expected objects of certain types can also be used. Such state variables can have integer values (e.g., 0, 1, 2, . . . ) and be modeled to follow a Poisson/exponential or birth-death process. For example, state variable $S_{ve}$, $S_{pe}$, and $S_{bi}$ can indicate, respectively, how many vehicles, bicycles, and pedestrians are expected in the scene.

The reward function can be based on the observations of vehicle after an action is taken. For example, the reward can be based on whether an object is detected or not, whether an object is detected on the right or not, whether an object is detected on the left or not, whether the path is obstructed or not, whether a detected object is classified (e.g., recognized) or not, whether detected object is deemed dangerous or not, fewer criteria, more criteria, or a combination thereof.

To restate, the state indicates a location along the SD map, whether there are any perceived features (such as moving objects, blockages in the road, obstructions, or any other objects). For example, there may be a building on the right side of the road and a high fence on the left side of the road. These features may otherwise be available in an HD map but may not be in the SD map. Thus, sensor data of the vehicle may be used to recognize these features (such as obstructions). The safety DC 1306 can be determine an action (e.g., stop, edge, or go at each of the points on the SD map (e.g., every 10, 20, 100 meters so some other distance) along with an orientation for the action (e.g., left, right, center).

In an example, the safety DC 1306 can use a goal uncertain Stochastic Shortest Path (GU-SSP) instead of POMDP. GU-SSP can be used to model path planning and decision making in stochastic environments with goal uncertainty. GU-SSP is described in S. Saisubramanian, K. H. Wray, L. Pineda and S. Zilberstein, "Planning in Stochastic Environments with Goal Uncertainty," 2019 *IEEE/RSJ International Conference on Intelligent Robots and Systems (IROS)* Macau. China, 2019, pp. 1649-1654, doi: 10.1309/IROS40897.2019.8967718.

Figure 14:
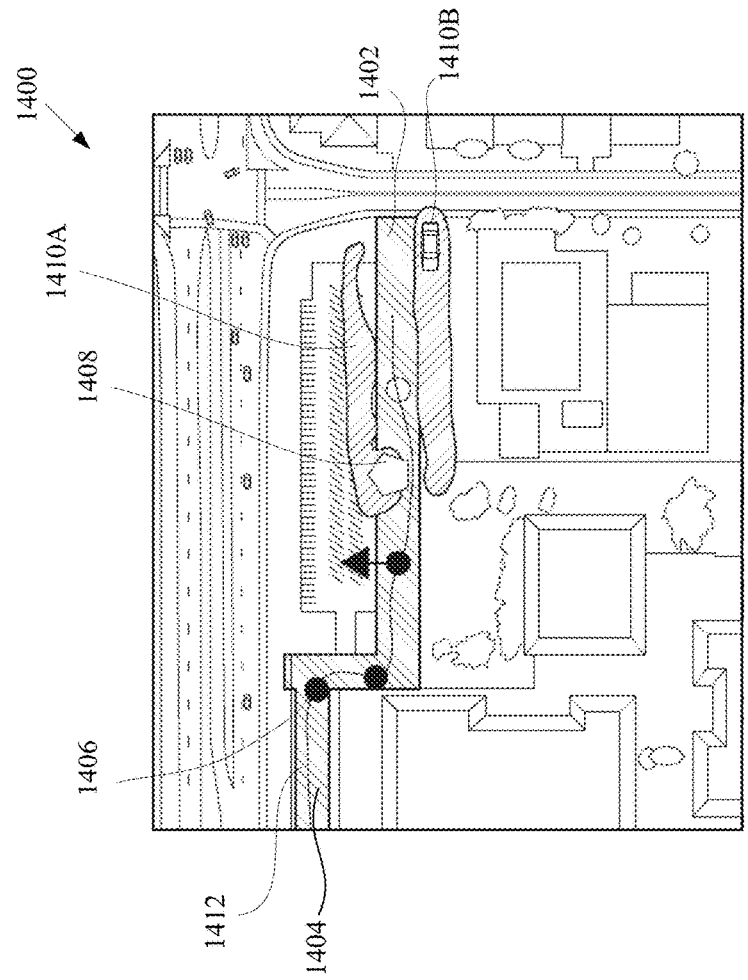
FIG. 14 is an illustration on an example of mapping of a road of an SD map according to implementations of this disclosure.

FIG. 14 is an illustration on an example 1400 of mapping of a road of an SD map according to implementations of this disclosure. The example 1400 illustrates how an AV 1402 can, using sensors of the AV 1404, map a road of an SD map. The data from sensors of the AV can be used to detect HD information of the road of the SD map.

The example 1400 illustrates a map that includes a road 1404 that is not included in an HD map of the vehicle. That is, the road 1404 is not mapped. However, the road 1404 is included in an SD map of the vehicle. An initial width or lanes of the road 1404 may be estimated from the SD map. The width and lanes can be estimated using any lane recognition techniques. Circles, such as a circle 1406, indicate locations along the road where decisions of the safety DC 1306 of FIG. 13 provides actions to the trajectory planner of the AV 1402.

An object 1408 is detected by the mapper 1304 of FIG. 13. A particular operational scenario associated with the object 1408 can be identified and a corresponding DC is instantiated to handle (e.g., deal with, avoid, get around, etc.) the object 1408. For example, the object 1408 may be determined to be a parked vehicle indicating that the operational scenario is a "pass vehicle scenario" and the corresponding DC is instantiated to get around the object 1408. Areas 1410A, 1410B may be recognized as non-drivable areas and are computed from HD sensors of the vehicle 1402.

A trajectory 1412 illustrates a trajectory that the vehicle 1402 followed on the road 1412. The trajectory 1412 can be determined by a decision making process of the vehicle, which can be or can include at least the planner 1302 and the safety DC 1306 of FIG. 13. The decision making process selects the actions for controlling the vehicle 1402. The actions can be as described above, such as go right, go left, go straight, stop, edge, and so on.

Figure 15:
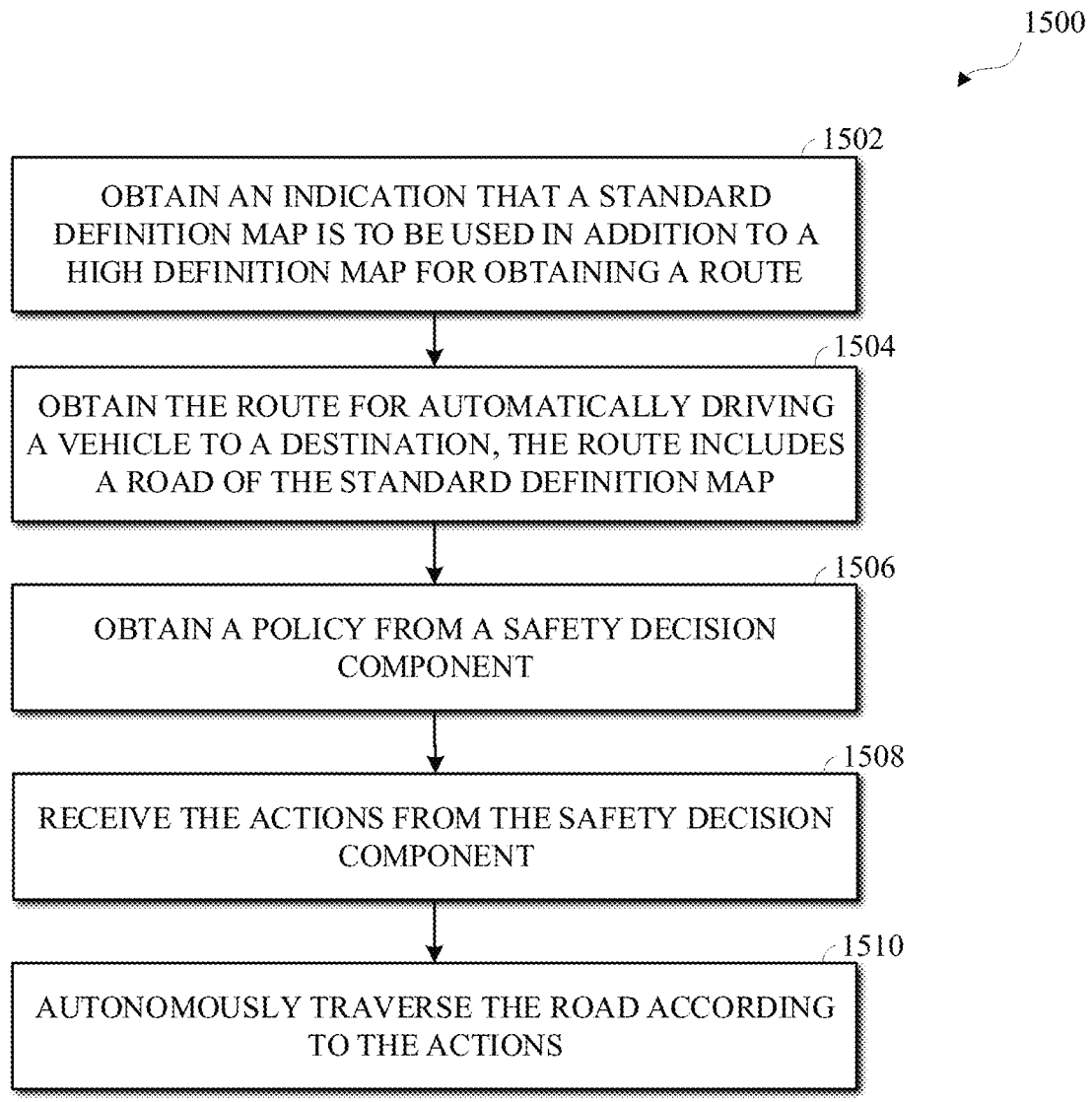
FIG. 15 is a flowchart of an example of a technique for route planning in automated driving of an autonomous vehicle according to an implementation of this disclosure.

FIG. 15 is a flowchart of an example of a technique 1500 for route planning in automated driving of an autonomous vehicle according to an implementation of this disclosure. The technique 1500 can be implemented by or in an autonomous vehicle. The autonomous vehicle can be a semi-autonomous vehicle. The technique 1500 can be implemented as instructions (e.g., operations) that are stored in a memory, such as the memory 134 of FIG. 1. The instructions can be executed by a processor, such as the processor 133 of FIG. 1. The technique 300 can be implemented using specialized hardware or firmware. Multiple processors, memories, or both, may be used.

At 1502, the technique 1500 obtains an indication that a standard definition map is to be used in addition to a high definition map for obtaining a route. The indication can be obtained from a user (e.g., driver, occupant) of the AV. In an example, the indication can be obtained from a tele-operator. In an example, the indication can be provided as an objective to a route planner that obtains the route. The route planner can be a multi-objective route planner as described herein. The objective can be provided using a user interface, which can be as described herein such as with respect to FIGS. 10 and 11. In an example, the indication may be provided via a verbal command that can essentially communicate the command "explore unmapped roads."

At 1504, the technique 1500 obtains the route for automatically driving the vehicle to a destination. The route includes a road of the standard definition map. The route can be obtained using a Markov decision process (MDP). The Markov decision process can be a POMDP. The Markov decision process can include a state space that indicates a traversability of the road, as described above with respect to the traversability $S_t$.

At 1506, the technique 1500 obtains a policy from a safety decision component. The safety decision component can be as described above with respect to the safety DC 1306 of FIG. 13. As such, the policy provides actions for states the road and the actions constrain a trajectory of the autonomous vehicle along the road. As described above, the state space of the safety decision component includes, for a location of the road, whether motion is detected at the location and whether an obstacle is detected at the location. The safety decision component includes an action space. An action of the action space to be taken at the location of the road indicates a movement and a direction of the movement.

At 1508, the technique 1500 receives the actions from the safety decision component. The safety decision component can provide an action at each respective timestep. The actions are obtained using the policy. At 1510, the technique 1500 autonomously traverses the road according to the actions. That is, the actions can be provided to a trajectory planner of the vehicle and the vehicle can be controlled according to the actions to traverse the road. Autonomously traversing the road according to the actions can include identifying an operational scenario along the route and instantiating a decision component to the operational scenario. To illustrate, as the vehicle is traversing the road, an intersection may be identified using sensor data of the vehicle. A DC for traversing the intersection can be then be instantiated to provide the actions to traverse the intersection.

In an example, the technique 1500 further comprises identifying lane segments of the road and storing lane segment information of the lane segments in a navigation map, which can be as described above.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for providing explanations in route planning, comprising:
   determining a route based on at least two objectives and a user preference with respect to the at least two objectives received from a user,
      wherein the user preference corresponds to a prioritization of the at least two objectives,
      wherein a second objective of the at least two objectives is constrained to within a slack value of a first objective of the at least two objectives when the user preference indicates that the first objective is of higher priority than the second objective,
      wherein the slack value defines a deviation from the first objective to improve the second objective,
      wherein the route is determined using the slack value, and
      wherein the at least two objectives comprise an urban objective relating to a preference for urban lane segments as opposed to rural lane segments;
   controlling an autonomous vehicle to traverse the route;
   receiving, from the user, a request for an explanation as to an action along the route; and
   providing the explanation to the user, wherein the explanation describes an extent of violating the slack value.

2. The method of claim 1, wherein the at least two objectives further comprise at least two of a time objective, a comfort objective, or an autonomy objective.

3. The method of claim 1, wherein determining the route based on the at least two objectives comprises:
   maintaining, for at least an objective of the at least two objectives, respective costs of performing lane segment transitions from a current lane segment.

4. The method of claim 3, wherein providing the explanation to the user comprises:
   determining, using the respective costs of performing the lane segment transitions from the current lane segment, a difference between a first expected discount reward value associated with a first optimal action of the first objective and a second expected discount reward value associated with a second action of the first objective, wherein the second action is a selected action and is associated with the second objective.

5. The method of claim 4, wherein the explanation comprises respective descriptors of the first optimal action, the second action, the first objective, the second objective, and the extent to which the second action violates the slack value.

6. The method of claim 1, wherein the explanation is provided in at least one of a visual, haptic, or an auditory modality.

7. The method of claim 1, further comprising:
   receiving, from the user, the first objective, the second objective, and the slack value.

8. The method of claim 7, wherein the first objective, the second objective, and the slack value are received from the user in a verbal command.

9. An apparatus for route planning for an autonomous vehicle (AV), comprising:
   a processor configured to:
      receive, from a user, a first objective for optimizing routes from an origin location to a destination;
      receive, from the user, a second objective for optimizing at least a subset of the routes from the origin location to the destination;
      receive, from the user, a user preference that corresponds to a prioritization among the first objective and the second objective;
      receive, from the user, a slack value that defines a deviation from a higher prioritized objective to improve less prioritized objective, wherein the higher prioritized objective is one of the first objective or the second objective, and the less prioritized objective is the other of the first objective or the second objective;
      plan a route that satisfies the first objective and the second objective and the slack value; and
      control the AV to traverse the route.

10. The apparatus of claim 9, wherein to plan the route comprises to obtain a policy that, when the AV is on a first lane segment, provides an action for controlling the AV to move to a second lane segment that neighbors the first lane segment.

11. The apparatus of claim 9, wherein the route includes a transition from a first segment of a first lane of a road along the route to a second segment of a second lane of the road.

12. The apparatus of claim 9, wherein the user provides the first objective, the second objective, and the slack value in a verbal command.

13. The apparatus of claim 9, the processor further configured to:
provide a user interface to the user, wherein the user uses the user interface to construct a directed graph of objectives including the first objective, the second objective, and the slack value.

14. The apparatus of claim 9, wherein the processor is further configured to:
control the AV to move from a first lane segment to a second lane segment along the route;
receive, from the user, a request for an explanation as to why the second lane segment instead of a third lane segment was taken; and
provide the explanation, wherein the explanation describes an extent to which a second action violates the slack value.

15. The apparatus of claim 14, wherein the explanation comprises respective descriptors of the first objective, the second objective, and the extent to which the second action violates the slack value.

16. A non-transitory computer-readable storage medium, comprising executable instructions that, when executed by a processor, facilitate performance of operations for route planning for an autonomous vehicle (AV), the operations comprising operations to:
receive, from a user, a first objective for optimizing a route from an origin location to a destination;
receive, from the user, a second objective for optimizing the route from the origin location to the destination;
receive, from the user, a user preference with respect to the first objective and the second objective;
receive, from the user, a slack value that defines a deviation from the first objective to improve the second objective;
determine a route based on the first objective, the second objective, the user preference, and the slack value, and wherein the route includes a move from a first lane segment to a second lane segment;
control the AV to move from the first lane segment to the second lane segment along the route;
receive, from the user, a request for an explanation as to why the second lane segment instead of a third lane segment was taken, wherein the explanation comprises respective descriptors of the first objective, the second objective, and an extent to which the slack value is violated; and
provide the explanation.

17. The non-transitory computer-readable storage medium of claim 16, wherein to determine the route comprises to obtain a policy that, when the AV is on the first lane segment, provides second action for controlling the AV to move to the second lane segment that neighbors the first lane segment.

18. The non-transitory computer-readable storage medium of claim 16, wherein the route includes a transition from a first segment of a first lane of a road along the route to a second segment of a second lane of the road.

19. The non-transitory computer-readable storage medium of claim 16, wherein the user provides the first objective, the second objective, and the slack value in a verbal command.

20. The non-transitory computer-readable storage medium of claim 16, wherein the operations further comprises operations to:
provide a user interface to the user, wherein the user uses the user interface to construct a directed graph of objectives including the first objective, the second objective, and the slack value.

* * * * *